(12) United States Patent
Howard

(10) Patent No.: US 12,283,135 B2
(45) Date of Patent: Apr. 22, 2025

(54) DETECTION AND ALERTING OF VEHICLE SAFETY SYSTEM ISSUES

(71) Applicant: RM ACQUISITION, LLC, Boise, ID (US)

(72) Inventor: Shaun M. Howard, Irvine, CA (US)

(73) Assignee: RM ACQUISITION, LLC, Chicago, IL (US)

( * ) Notice: Subject to any disclaimer, the term of this patent is extended or adjusted under 35 U.S.C. 154(b) by 257 days.

(21) Appl. No.: 17/162,575

(22) Filed: Jan. 29, 2021

(65) Prior Publication Data

US 2022/0245971 A1 Aug. 4, 2022

(51) Int. Cl.
*G07C 5/00* (2006.01)
*G06N 20/00* (2019.01)
*G07C 5/08* (2006.01)

(52) U.S. Cl.
CPC ............ *G07C 5/006* (2013.01); *G06N 20/00* (2019.01); *G07C 5/008* (2013.01); *G07C 5/0808* (2013.01)

(58) Field of Classification Search
CPC ...... G07C 5/006; G07C 5/008; G07C 5/0808; G06N 20/00
USPC ........................................................ 701/31.4
See application file for complete search history.

(56) References Cited

U.S. PATENT DOCUMENTS

| | | | |
|---|---|---|---|
| 8,897,953 B2 | 11/2014 | Olsen, III et al. | |
| 9,026,304 B2 | 5/2015 | Olsen, III et al. | |
| 9,471,452 B2 | 10/2016 | McElhinney et al. | |
| 9,780,967 B2 | 10/2017 | Sargent et al. | |
| 9,881,428 B2 | 1/2018 | Barfield, Jr. et al. | |
| 10,060,827 B2 | 8/2018 | Schnell et al. | |
| 10,062,219 B2 | 8/2018 | Richter et al. | |
| 10,217,066 B1 * | 2/2019 | Margherio | G06Q 10/06 |

(Continued)

FOREIGN PATENT DOCUMENTS

| | | |
|---|---|---|
| WO | WO 2014/094126 A1 | 6/2014 |
| WO | WO 2014/116197 A1 | 7/2014 |

(Continued)

OTHER PUBLICATIONS

Jhou et al., "The Implementation of OBD-II Vehicle Diagnosis System Integrated with Cloud Computation Technology", Second International Conference on Robot, Vision and Signal Processing, 2011, pp. 9-12, (four (4) pages).

(Continued)

*Primary Examiner* — Marc Burgess
*Assistant Examiner* — John D Holman
(74) *Attorney, Agent, or Firm* — MARSHALL, GERSTEIN & BORUN LLP

(57) ABSTRACT

A system detects vehicle safety system issues present within a fleet vehicle. A plurality of diagnostic trouble codes (DTCs) collected or generated by an onboard computing system of the vehicle are received via a network. The system determines two or more of the DTCs occurred within a predetermined threshold. The two or more DTCs correspond to different sources within the vehicle. A common theme is determined between the plurality of DTCs having different sources. The two or more DTCs that occurred within the predetermined threshold are correlated with a vehicle safety system issue stored in an issue database. An alert is transmitted based on the correlated vehicle safety system issue to a recipient via the network.

20 Claims, 11 Drawing Sheets

(56) References Cited

U.S. PATENT DOCUMENTS

| | | |
|---|---|---|
| 2007/0203637 A1 | 8/2007 | Passman et al. |
| 2014/0121888 A1 | 5/2014 | Guo et al. |
| 2014/0288761 A1* | 9/2014 | Butler .................. G07C 5/0816 |
| | | 701/29.6 |
| 2016/0035150 A1* | 2/2016 | Barfield, Jr. ....... G05B 23/0254 |
| | | 701/29.3 |
| 2016/0035152 A1 | 2/2016 | Kargupta |
| 2019/0066407 A1 | 2/2019 | Kwak |
| 2020/0175782 A1* | 6/2020 | Tokman .................. G07C 5/008 |
| 2020/0334927 A1* | 10/2020 | Rozint .................. G07C 5/0841 |

FOREIGN PATENT DOCUMENTS

| | | |
|---|---|---|
| WO | WO 2016/145107 A2 | 9/2016 |
| WO | WO 2017/218362 A1 | 12/2017 |
| WO | WO 2019/141411 A1 | 7/2019 |

OTHER PUBLICATIONS

Cover page of EP 2936449 A published Oct. 28, 2015 (one (1) page).
Cover page of EP 2948744 A1 published Dec. 2, 2015 (one (1) page).

\* cited by examiner

900

DETECTION AND ALERTING OF VEHICLE SAFETY SYSTEM ISSUES

BACKGROUND AND SUMMARY OF THE INVENTION

Safety systems may be employed in every modern commercial vehicle. Vehicle safety components may degrade, lose calibration, and fail, either suddenly or gradually over time. A compromised vehicle safety component may behave inconsistently or even erratically, generating erroneous operational states on the vehicle's system bus in the form of diagnostic trouble codes (DTCs).

Currently, onboard data collection units may collect and transmit vehicle DTCs and other relevant vehicle data to smartphone applications or fleet management back-end servers for collection, interpretation, and decision-making. Fleet managers may review this data to detect potential issues and determine what actions, if any, are appropriate.

The present subject matter may provide an automated, scalable issue detection system that can be applied to data generated from a fleet comprising thousands of vehicles. According to an embodiment of the present subject matter a method of detecting vehicle safety system issues includes receiving a plurality of diagnostic trouble codes (DTCs) collected or generated by an onboard computing system of a vehicle via a network. The method further includes determining, using a computing device communicably coupled to the network, two or more of the DTCs occurred within a predetermined threshold time or distance. The method further includes determining that a plurality of source identifiers (ID) corresponding to and identifying the source of each of the plurality of DTCs are different. The method further includes determining a common element between the plurality of DTCs having different source identifiers. The method further includes correlating the two or more DTCs that occurred within the predetermined threshold with a vehicle safety system issue stored in an issue database. The method further includes transmitting an alert based on the correlated vehicle safety system issue to a recipient via the network. A quantity of the plurality of diagnostic trouble codes generated by the onboard computing system of the vehicle is greater than a specified percentile of other vehicles within a vehicle fleet. The DTCs generated by the onboard computing system are based on vehicle safety subsystems or components. At least two of the DTCs received are of different types. The vehicle is a first vehicle, and the method further includes receiving a second plurality of DTCs collected or generated by an onboard computing system of a second vehicle via a network. The DTC trouble codes generated by the first and second vehicles are unusual or disparate when compared with a third plurality of DTCs generated by a remaining plurality of vehicles of a vehicle fleet. The method further includes not receiving the third plurality of DTCs. The method further includes transmitting a suggested course of action to the recipient, the suggested course of action comprising at least one of: a vehicle diagnostic test; a vehicle inspection; a vehicle maintenance procedure; or a vehicle repair procedure. The method further includes correlating the two or more DTCs that occurred within the predetermined threshold with a vehicle safety system issue stored in a maintenance history database storing previous actions carried out on the vehicle. The issue database is populated based on feedback provided by a user. The feedback identifies a vehicle issue based on a plurality of DTCs that occurred within a predetermined threshold time or distance. The common element is a vehicle component. The method further includes receiving additional vehicle data from the onboard computing system of the vehicle. The method further includes determining, based on the additional vehicle data, that an absence or abundance of expected data exists. The correlating of the two or more DTCs that occurred within the predetermined threshold with the vehicle safety system issue is further correlated with the absence or abundance of expected data. The method further includes grouping the two or more DTCs that occurred within the predetermined threshold time or distance into a DTC cluster using a machine learning algorithm, assigning the DTC cluster an issue name, and populating the issue database based on the assigned issue name and DTC cluster.

According to an embodiment of the present subject matter a system for detecting vehicle safety system issues includes a processor and a memory in communication with the processor. The memory stores a plurality of instructions executable by the processor to cause the system to receive a plurality of diagnostic trouble codes (DTCs) collected or generated by an onboard computing system of a vehicle via a network. The memory further includes a plurality of instructions executable by the processor to cause the system to determine two or more of the DTCs occurred within a predetermined threshold time or distance. The memory further includes a plurality of instructions executable by the processor to cause the system to determine that a plurality of source identifiers (ID) corresponding to and identifying the source of each of the plurality of DTCs are different. The memory further includes a plurality of instructions executable by the processor to cause the system to determine a common element between the plurality of DTCs having different source identifiers. The memory further includes a plurality of instructions executable by the processor to cause the system to correlate the two or more DTCs that occurred within the predetermined threshold with a vehicle safety system issue stored in an issue database. The memory further includes a plurality of instructions executable by the processor to cause the system to transmit an alert based on the correlated vehicle safety system issue to a recipient via the network. The plurality of diagnostic trouble codes generated by the onboard computing system of the vehicle is greater than a specified percentile of other vehicles within a vehicle fleet. The DTCs generated by the onboard computing system are based on vehicle safety subsystems or components. At least two of the DTCs received are of different types. The vehicle is a first vehicle, and the memory further comprises instructions to cause the system to receive a second plurality of DTCs collected or generated by an onboard computing system of a second vehicle via a network. The DTC trouble codes generated by the first and second vehicles are unusual or disparate when compared with a third plurality of DTCs generated by a remaining plurality of vehicles of a vehicle fleet, and the memory further includes a plurality of instructions executable by the processor to cause the system to not receive the third plurality of DTCs. The memory further comprises instructions to cause the system to transmit a suggested course of action to the recipient, the suggested course of action comprising at least one of: a vehicle diagnostic test; a vehicle inspection; a vehicle maintenance procedure; or a vehicle repair procedure. The memory further comprises instructions to cause the system to correlate the two or more DTCs that occurred within the predetermined threshold with a vehicle safety system issue stored in a maintenance history database storing previous actions carried out on the vehicle. The issue database is populated based on feedback provided by a user. The feedback identifies a vehicle issue based on a plurality of DTCs that occurred within a predetermined threshold time or distance. The common element is a vehicle component. The memory further comprises instructions to cause the system to receive additional vehicle data from the onboard computing system of the vehicle. The memory further includes a plurality of instructions executable by the processor to cause the system to determine, based on the additional vehicle data, that an absence or abundance of expected data exists. The correlating of the two or more DTCs that occurred within the predetermined threshold with the vehicle safety system issue is further correlated with the absence or abundance of expected data. The memory further includes a plurality of instructions executable by the processor to cause the system to group the two or more DTCs that occurred within the predetermined threshold time or distance into a DTC cluster using a machine learning algorithm, assign the DTC cluster an issue name, and populate the issue database based on the assigned issue name and DTC cluster.

Other objects, advantages and novel features of the present invention will become apparent from the following detailed description of one or more preferred embodiments when considered in conjunction with the accompanying drawings.

DETAILED DESCRIPTION OF THE DRAWINGS

In the following description of the present subject matter, reference is made to the accompanying figures which form a part thereof, and in which is shown, by way of illustration, exemplary embodiments illustrating the principles of the present subject matter and how it may be practiced. Other embodiments can be utilized to practice the present subject matter and structural and functional changes can be made thereto without departing from the scope of the present subject matter.

As used herein, the term "issue" in the context of a vehicle may refer to a problem, abnormality, irregularity, error, deficiency, reduction, limitation, or defect that impairs some portion of the vehicle's functionality. A vehicle that exhibits an issue may be observable or unobservable by a user operating the vehicle. An issue may manifest continuously or intermittently.

It may be difficult for fleet managers to detect vehicle safety issues by parsing through a sample of collected vehicle diagnostic data. In doing so, the fleet manager may need to understand the conditions that form an issue and forward the relevant data to a service technician who can troubleshoot and repair the issue on the vehicle. This process to detect issues may be expensive and unscalable beyond a few vehicles for each fleet manager.

The present subject matter may automatically exploit wirelessly collected vehicle DTC data and other relevant data to proactively detect vehicle safety system issues without manual intervention by a user. The data may be collected across a fleet of vehicles equipped with safety systems. Statistical distributions of the DTC rates may be created across the entire vehicle fleet. Data "outliers" may be detected in the rate distributions in support of determining that a safety system component of the vehicle is malfunctioning or otherwise exhibiting issues. The determination as to whether a vehicle is exhibiting issues may be based on combinations of one or more concurrent DTCs occurring on one or more safety subsystems of the vehicle. These DTCs may be used solely or in combination with other collected vehicle data to determine if a vehicle has issues. Issues may be identified and labeled by assigning one or more high-level issue names, descriptions, and maintenance remedies from an issue database for each vehicle based on the outlier DTC(s) and other data obtained from those vehicles. Safety alerts may be transmitted to other fleet vehicles, fleet managers, drivers, and the like.

Figure 1:
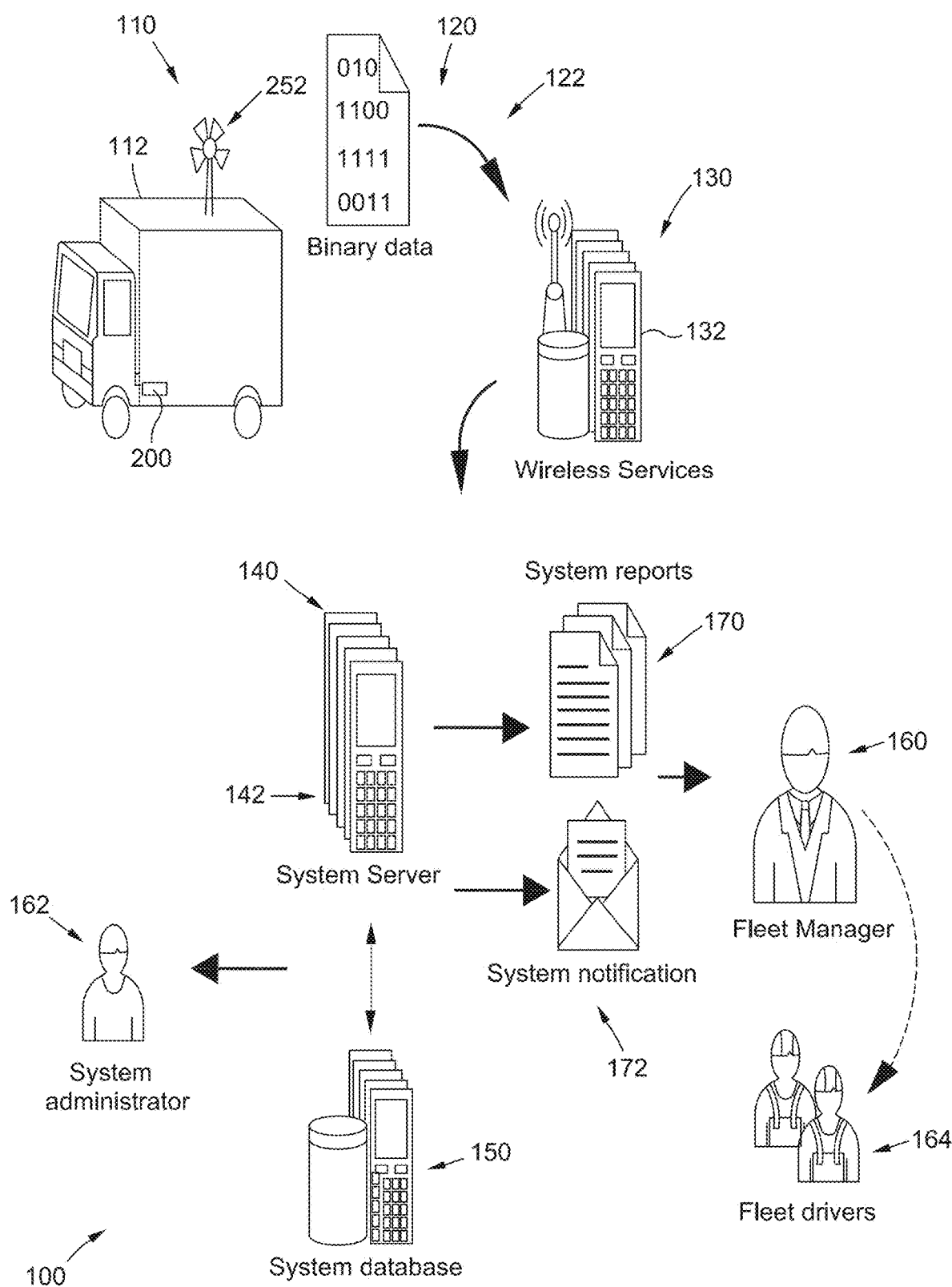
FIG. 1 is a diagram of an overview of a fleet management system in accordance with an embodiment of the present subject matter.

FIG. 1 illustrates an overview of a vehicle data collection system 100 in accordance with an embodiment. In this example embodiment, a fleet of vehicles 110, such as trucks and cars, and particularly vehicles 112, may be configured with an event detection and reporting system 200 (see FIG. 2A), which may be an in-vehicle computing system that generates actual data relating to driving and vehicle events that may be of interest to a fleet manager 160 or another user. Such a system 200 may include, for example, a Lane Departure Warning (LDW) system 222 (FIG. 2A) that may generate signals indicative of an actual lane departure, such as lane wandering or crossing. Additionally, secondary systems to be described in greater detail below with reference to FIG. 2A may be carried by the vehicles or installed in the vehicle systems, include one or more video cameras, radar, lidar, transmission, engine, tire pressure monitoring and braking systems, for example, may generate additional safety event data and driver behavior data. Front facing cameras, radar and lidar-based system may also be used to provide data relating to driver behavior in the context of following distance, headway time, response to speed signs, and anticipation of needed slowing.

With continued reference to FIG. 1, event data 120 may be selectively sent via communication links 122 to network servers 132 of one or more service providers 130. Communication service providers 130 may utilize servers 132 (only one shown for ease of illustration) that collect data 120 provided by the vehicles 112. Event data 120 may include events that occur on a vehicle 110 during deviant or irregular driving behavior, such as when a driver 164 veers from his/her lane, causing a lane departure warning (LDW), changing lanes without a turn signal, following a forward vehicle too closely (forward collision warning; FCW), excessive braking, and the like. In general, vehicle events that generate event data 120 may be caused, directly and/or indirectly, by actions of the driver 164. The event detection and reporting system 200 may collect sensor data from pertinent sensors when vehicle events occur on equipped vehicles 112. If safety systems are not working correctly, the event data 120 transmitted from the affected vehicle 112 may appear unusual when compared with a population distribution of the data from the vehicle fleet 110. Accordingly, statistical vehicle event data, such as the rate of occurrence of one or more the vehicle event(s) for the vehicle fleet 110 may be used as a basis for determining whether a vehicle 112 has one or more issues.

One or more servers 140 of the vehicle data collection system 100 may be configured to selectively download, receive, or otherwise retrieve data either directly from the vehicles 112 via the service providers 130 or from collection servers 132 which may be third party servers from one or more various telematics suppliers or cellular providers. Servers 140 may be configured to initiate processing of the event data in manners to be described in greater detail below.

A web application 142 executable on the one or more servers 140 of the vehicle data collection system 100 may include a dynamic graphical user interface for fleet managers 160 and administrators 162 to view all the information once it is processed. The vehicle data collection system 100 of the example embodiment may also include one or more databases 150 configured to selectively store all event information provided from the vehicles 112 in the fleet 110 for one or more designated time intervals, including raw and post-processed trip data.

In accordance with the example embodiment, the system administrators 162 may be users who are provided with interfaces to configure and manage fleets, monitor platform performance, view alerts issued by the platform, and view driver and event data and subsequent processing logs and/or views. Fleet managers 160 may view event information for their respective fleet for internal processing. These events may arrive via user-initiated reports 170/335 in the web application 142 executable on the one or more servers 140, or via email or other notifications 172. Fleet managers 160 may, depending on internal policies and processes or for other reasons, also interface with individual drivers 164 regarding performance goals, corrections, reports, or coaching.

Figure 2A:
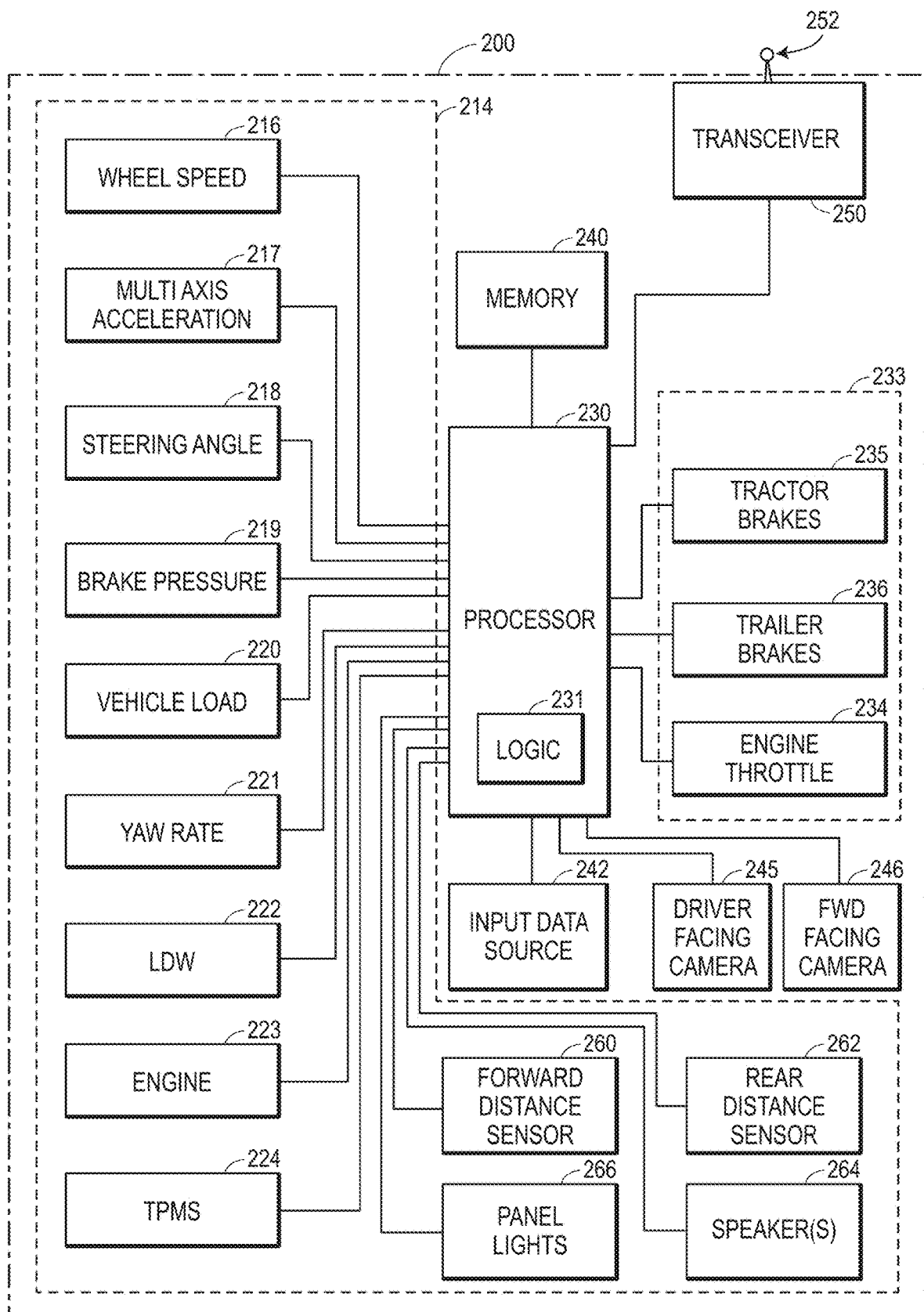
FIGS. 2A and 2B are block diagrams illustrating an embodiment of a vehicle-based computer system in accordance with an embodiment of the present subject matter.

Referring now to FIG. 2A, depicted is a schematic block diagram that illustrates details of an event detection and reporting system mentioned above, and which is configured to be used in accordance with an embodiment of the present subject matter. As further detailed below, the in-vehicle event detection and reporting system 200 may be adapted to detect a variety of operational parameters and conditions of the vehicle 112 and the driver's interaction therewith and, based thereon, to determine if a driving or vehicle event has occurred (e.g., if one or more operational parameter/condition thresholds has been exceeded). Data related to detected events (i.e., event data) may then be stored and/or transmitted to a remote location/server, as described in more detail below.

The event detection and reporting system 200 of FIG. 2A may include one or more devices or systems 214 for providing input data indicative of one or more operating parameters or one or more conditions of a commercial vehicle 112. It should be appreciated that vehicle devices, systems, and subsystems 214 may include additional as well as fewer devices, systems, and subsystems than those shown in FIG. 2A. Alternatively, the event detection and reporting system 200 may include a signal interface for receiving signals from the one or more devices or systems 214, which may be configured separate from system 200. For example, the devices 214 may be one or more sensors, such as but not limited to, one or more wheel speed sensors 216, one or more acceleration sensors/accelerometers, such as multi-axis acceleration sensors 217, a steering angle sensor 218, a brake pressure sensor 219, one or more vehicle load sensors 220, a yaw rate sensor 221, a lane departure warning (LDW) sensor or system 222, one or more engine speed or condition sensors 223, and a tire pressure (TPMS) monitoring system 224. The event detection and reporting system 200 may also utilize additional devices or sensors in the exemplary embodiment including for example a forward distance sensor 260 and a rear distance sensor 262 (e.g., radar, lidar, etc.). Other sensors and/or actuators or power generation devices or combinations thereof may be used of otherwise provided as well, and one or more devices or sensors may be combined into a single unit as may be necessary and/or desired.

The event detection and reporting system 200 may also include instrument panel lights 266 and speaker(s) 264, which may be usable to provide headway time/safe following distance warnings, lane departure warnings, and warnings relating to braking and or obstacle avoidance events.

The event detection and reporting system 200 may also include a logic applying arrangement such as a controller or processor 230 and control logic 231, in communication with the one or more devices or systems 214. The processor 230 may include one or more inputs for receiving input data from the devices or systems 214. The processor 230 may be adapted to process the input data and compare the raw or processed input data to one or more stored threshold values or desired averages, or to process the input data and compare the raw or processed input data to one or more circumstance-dependent desired value. The processor's 230 role may be to process input and outputs regarding safety, warning, or indication systems of the vehicle 112 and may be distinct from other onboard vehicle 112 processors that perform tasks such as controlling the ignition timing, obtaining measurements from a mass airflow sensor (MAF), pulsing fuel injectors, and the like. Processor 230 may communicate with other vehicle 112 processors via a vehicle data bus, such as a Controller Area Network (CAN bus), for example.

The processor 230 may also include one or more outputs for delivering a control signal to one or more vehicle systems 233 based on the comparison. The control signal may instruct the systems 233 to provide one or more types of driver assistance warnings (e.g., warnings relating to braking and or obstacle avoidance events) and/or to intervene in the operation of the vehicle 112 to initiate corrective action. For example, the processor 230 may generate and send the control signal to an engine electronic control unit or an actuating device to reduce the engine throttle 234 and slow the vehicle 112 down. Further, the processor 230 may send the control signal to one or more vehicle brake systems 235, 236 to selectively engage the brakes (e.g., a differential braking operation). A variety of corrective actions may be possible and multiple corrective actions may be initiated at the same time.

The event detection and reporting system 200 may also include a memory portion 240 for storing and accessing system information, such as for example, the system control logic 231. The memory portion 240, however, may be separate from the processor 230. The sensors 214 and processor 230 may be part of a pre-existing system or use components of a pre-existing system.

The event detection and reporting system 200 may also include a source of input data 242 indicative of a configuration/condition of a commercial vehicle 112. The processor 230 may sense or estimate the configuration/condition of the vehicle 112 based on the input data, and may select a control tuning mode or sensitivity based on the vehicle configuration/condition. The processor 230 may compare the operational data received from the sensors or systems 214 to the information provided by the tuning.

In addition, the event detection and reporting system 200 may be operatively coupled with one or more driver-facing imaging devices, shown in the example embodiment for simplicity and ease of illustration as a single driver facing camera 245 that may be trained on the driver and/or trained on the interior of the cab of the commercial vehicle 112. However, it should be appreciated that one or more physical video cameras may be disposed on the vehicle 112 such as, for example, a video camera on each corner of the vehicle 112, one or more cameras mounted remotely and in operative communication with the event detection and reporting system 200 such as a forward-facing camera 246 to record images of the roadway ahead of the vehicle 112. In the example embodiments, driver data may be collected directly using the driver facing camera 245 in accordance with a detected driver head position, hand position, or the like, within the vehicle being operated by the driver. In addition, driver identity may be determined based on facial recognition technology and/or body/posture template matching.

The event detection and reporting system 200 may also include a transmitter/receiver (transceiver) module 250 such as, for example, a radio frequency (RF) transmitter including one or more antennas 252 for wireless communication of the automated control requests, GPS data, one or more various vehicle configuration and/or condition data, or the like between the vehicles and one or more destinations such as, for example, to one or more services (not shown) having a corresponding receiver and antenna. In an example, transceiver may communicate cellularly using its antenna 252 over a cellular telephone network with a cloud-based computing system. The cloud computing system may be implemented, for example, by one or more servers 140, and/or servers 132. The transmitter/receiver (transceiver) module 250 may include various functional parts of sub portions operatively coupled with a platoon control unit including for example a communication receiver portion, a global position sensor (GPS) receiver portion, and a communication transmitter. For communication of specific information and/or data, the communication receiver and transmitter portions may include one or more functional and/or operational communication interface portions as well.

The processor 230 may be operative to combine selected ones of the collected signals from the sensor systems described above into processed data representative of higher-level vehicle condition data such as, for example, data from the multi-axis acceleration sensors 217 may be combined with the data from the steering angle sensor 218 to determine excessive curve speed event data. Other hybrid event data relatable to the vehicle 112 and driver of the vehicle 112 and obtainable from combining one or more selected raw data items from the sensors includes, for example and without limitation, excessive braking event data, excessive curve speed event data, lane departure warning event data, excessive lane departure event data, lane change without turn signal event data, loss of video tracking (LOVT) event data, LDW system disabled event data, distance alert event data, forward collision warning event data, haptic warning event data, collision mitigation braking event data, ATC event data, ESP event data, RSP event data, ABS event data, TPMS event data, engine system event data, average following distance event data, average fuel consumption event data, average ACC usage event data, and late speed adaptation (such as that given by signage or exiting).

The event detection and reporting system 200 of FIG. 2A may be suitable for executing embodiments of one or more software systems or modules that perform vehicle brake strategies and vehicle braking control methods according to the subject application. The example event detection and reporting system 200 may include a bus or other communication mechanism for communicating information, and a processor 230 coupled with the bus for processing information. The computer system includes a main memory 240, such as random-access memory (RAM) or other dynamic storage device for storing instructions and loaded portions of the trained neural network to be executed by the processor 230, and read only memory (ROM) or other static storage device for storing other static information and instructions for the processor 230. Other storage devices may also suitably be provided for storing information and instructions as necessary or desired.

Instructions may be read into the main memory 240 from another computer-readable medium, such as another storage device of via the transceiver 250. Execution of the sequences of instructions contained in main memory 240 may cause the processor 230 to perform the process steps described herein. In an alternative implementation, hard-wired circuitry may be used in place of or in combination with software instructions to implement the present subject matter. Thus, implementations of the example embodiments are not limited to any specific combination of hardware circuitry and software.

Figure 2B:
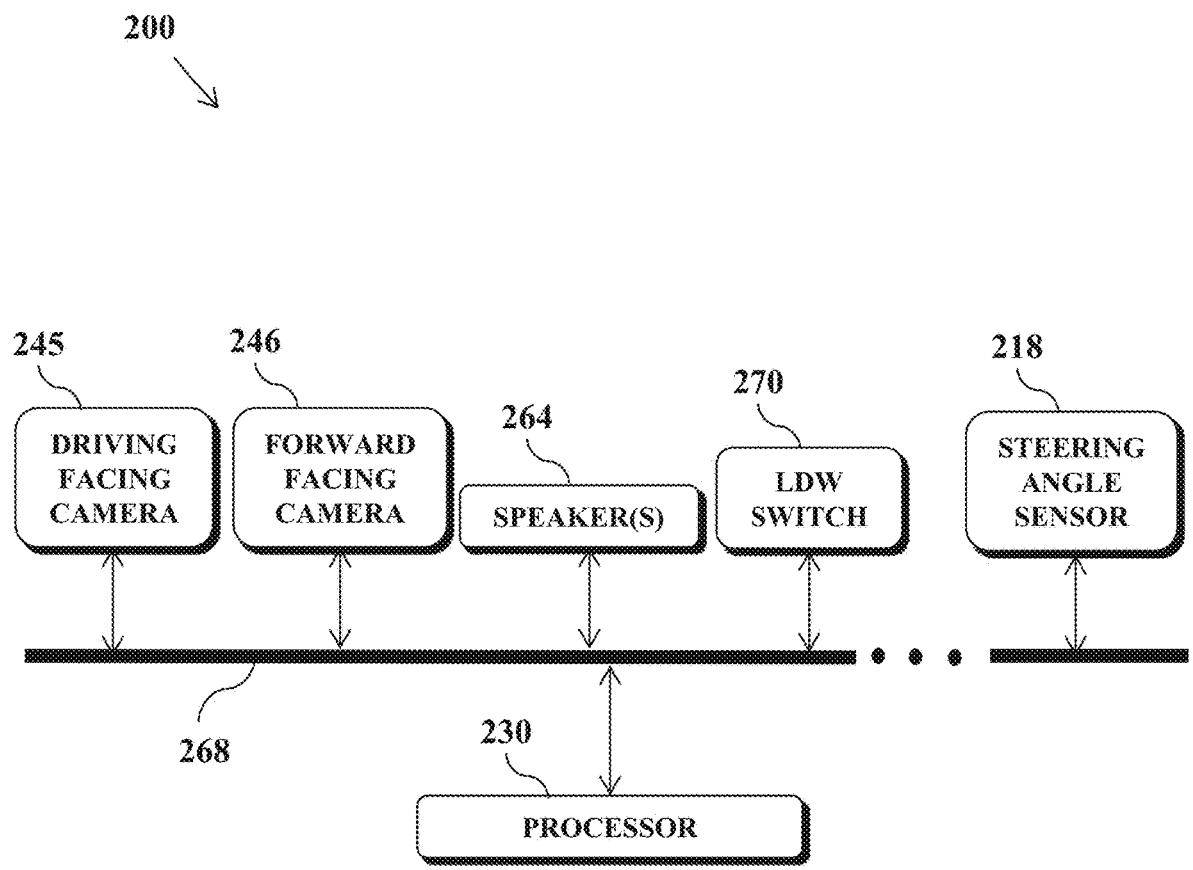

Referring now to FIG. 2B, only certain components of the event detection and reporting system 200 of FIG. 2A are depicted. As shown, various components of the system 200 are shown as being in communication with processor 230 by being connected to a vehicle bus 268, which can be a private bus dedicated to the system 200 or a general vehicle bus, CAN bus, and the like. As shown, in addition to DFC 245, FFC 246, speaker(s) 264 and steering angle sensor 218, an LDW switch 270 may also be shown as being in communication with processor 230 via bus 268. LDW switch 270 may be a component provided in the interior of a vehicle by which the driver can legitimately switch off the LDW system 222 on a temporary basis. This functionality may be provided so that drivers 164 can temporarily avoid receiving repeated unwarranted warnings due to certain unusual road conditions, such as passing through a construction area where lanes are significantly narrowed, rendering it impossible or very difficult to otherwise setting off the LDW system 222.

Referring to the components of FIG. 2B by way of example only, processor 230 may read and/or generate DTCs based on the malfunction of the attached systems and sensors connected via the vehicle bus(es) shown in FIGS. 2A and 2B, for example. Processor 230 may also generate DTCs based on detected faults of its own, such as when it fails to read/write to/from a memory such as memory 240, an external memory card, or a memory-mapped I/O device, such as a display. In one example, the processor 230 may read DTCs, decode the DTCs, and transmit them using the transceiver 250 via a cellular connection to servers 132, servers 140, or a cloud-based system.

Figure 3:
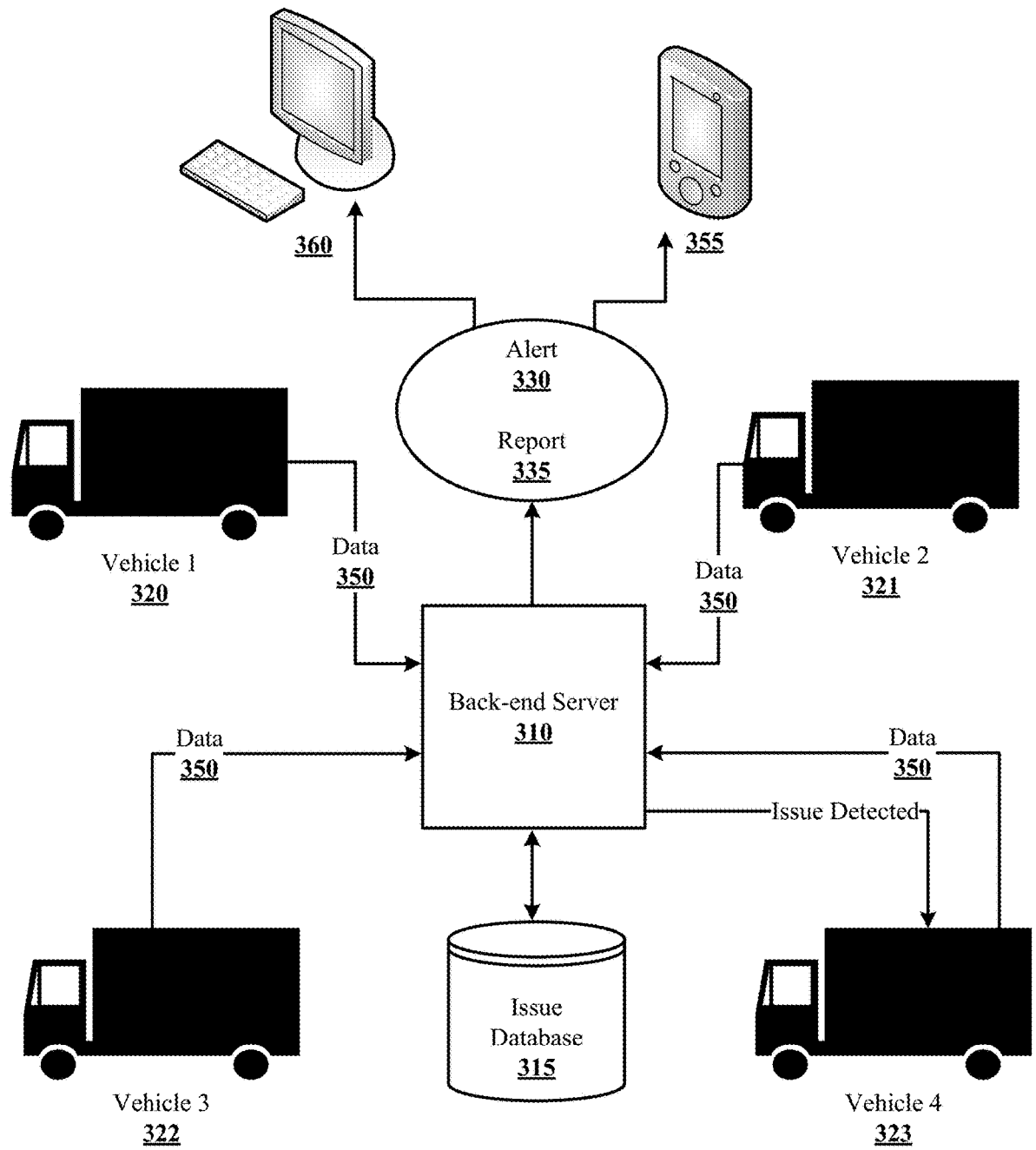
FIG. 3 illustrates a system overview of an issue detection and alert system in accordance with the present subject matter.

FIG. 3 illustrates a system overview 300 of an issue detection and alert system in accordance with the present subject matter. Each of the vehicles 320-323 may wirelessly transmit data 350 to back-end server 310. The back-end server 310 may be any suitable computing device with processing resources, memory resources, and input/output capabilities. The data 350 may include, for example, DTCs, raw sensor data, error messages, driver identification data, location/GPS coordinate data, odometer data, and the like, and may include timestamps associated with any of the aforementioned types of data. The vehicles 320-323 may transmit the data 350 to the back-end server 310 until a timeout, a network disconnect, or the issue resolves itself. Based on data 350 received from one or more of the vehicles 320-323, the back-end server 310 may detect whether there are any issues with the vehicle safety systems by executing software instructions embodied in a non-transitory computer readable medium via a processor. In response to determining at least one vehicle issue exists, the back-end server 310 may transmit an alert 330 and/or a report 335 to a website, web application, or web server 360, mobile device or smart phone 355, desktop computer, a maintenance team including one or more vehicle service technicians, or even other vehicles 320-323.

Figure 4:
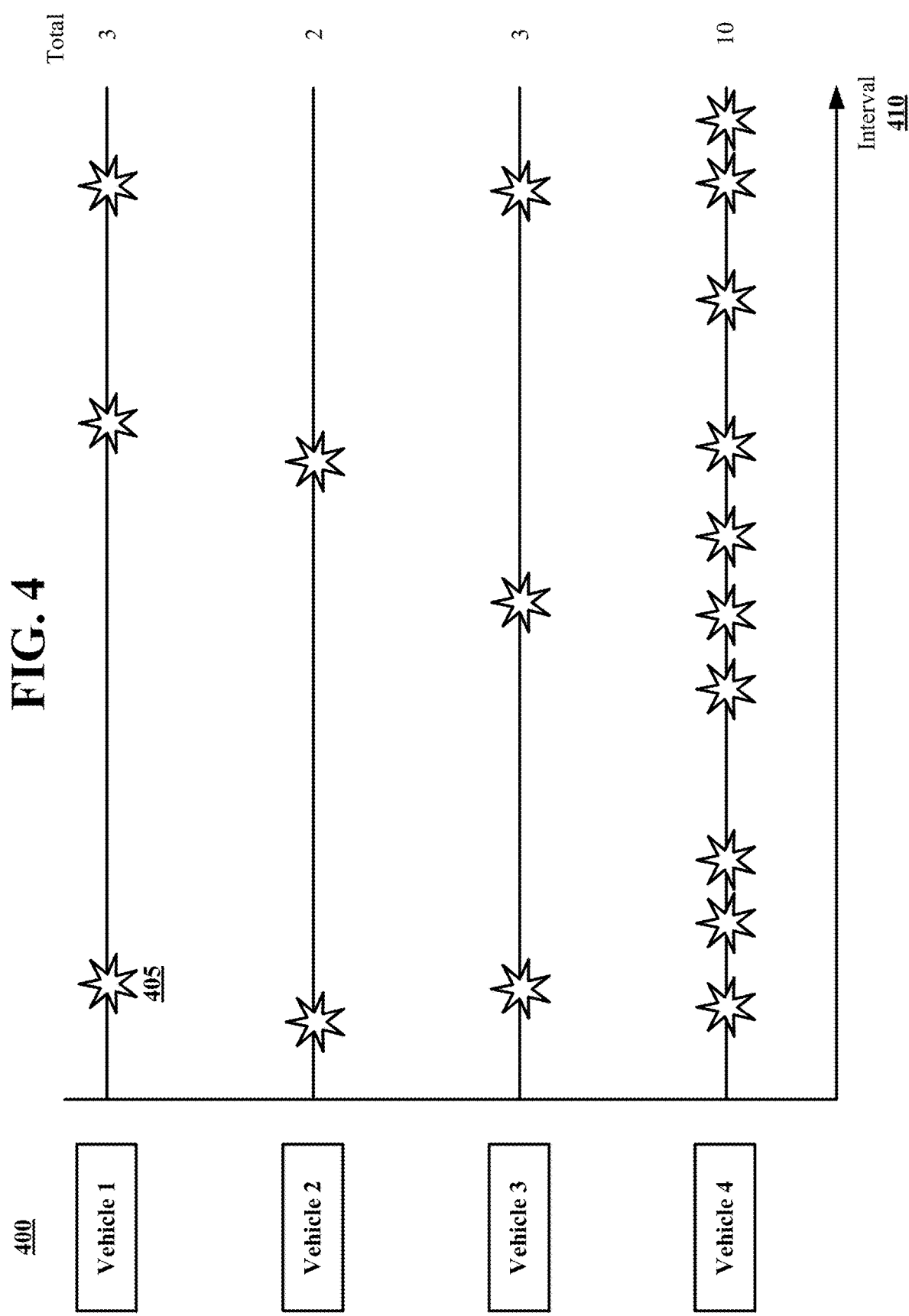
FIG. 4 is an example timeline showing diagnostic trouble codes (DTCs) occurring with an interval for each of four vehicles in accordance with the present subject matter.

FIG. 4 is an example timeline showing a number of DTCs 405 occurring within an interval 410 for each of vehicles 1-4 (320-323). Interval 410 may refer to time or distance, for example, and may be selected as any length of interest. For vehicles 1-3, it may be seen that three, two, and three DTCs, respectively, have occurred within the interval 410. In vehicle 4, however, ten DTCs have occurred, which may be a clear deviation and thus, an "outlier" from the average number of DTCs generated by vehicles 1-3 over the same interval 410. Vehicle 4 may be determined to be exhibiting at least one issue as a result, as will be subsequently discussed.

Figure 5:
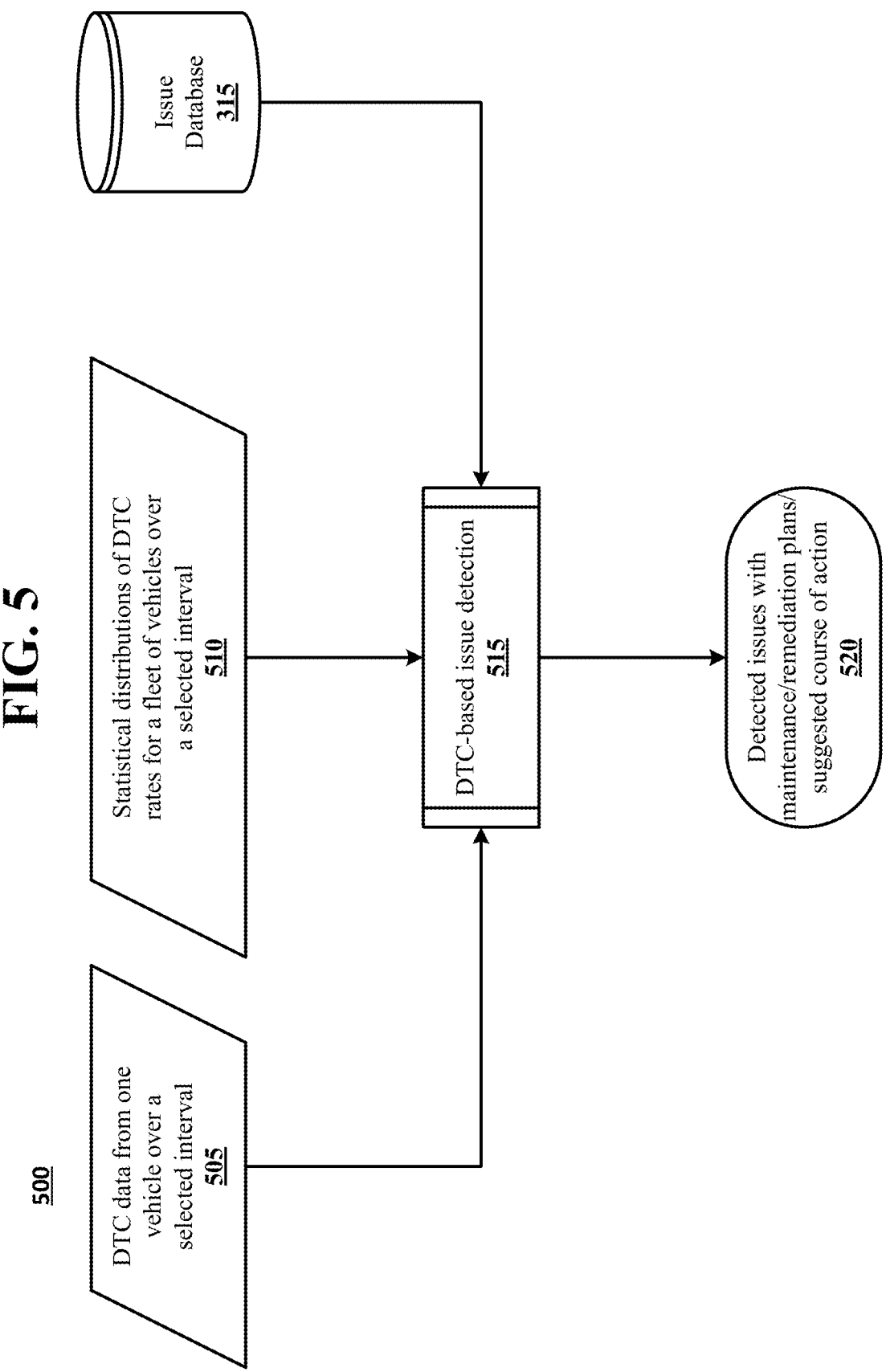
FIG. 5 shows an overview of a process to detect issues based on DTC data from a vehicle in accordance with the present subject matter.

FIG. 5 shows an overview of a process 500 to detect issues based on DTC data 350 from a vehicle. Process 500 may be performed, for example, by computing hardware embodied within the back-end server 310, as further described with reference to FIG. 8. A DTC-based issue detection process 515 may utilize DTC data 350 from a vehicle 112 over a selected interval 505, statistical distributions of DTC rates 510 for a vehicle fleet 110 comprising a plurality of vehicles 112 over a selected interval 410, and the issue database 315 previously discussed. The issue database 315 may be created manually by a user or via machine learning techniques. An example machine learning technique may be a supervised machine learning algorithm that utilizes a training data set to map one or more DTCs of different types to a set of vehicle issues, based on past patterns and correspondences. Another example machine learning technique may be an unsupervised machine learning algorithm, such as K-means clustering or DBSCAN, that clusters DTCs for each vehicle based on the distance or time between their occurrences on that vehicle. These clusters may then be automatically associated with one or more existing vehicle issues based on past patterns or they may constitute a new issue type as detected by the algorithm. These new issues may be reviewed and edited by users with access to the issue database 315 to fill in or correct any related data points. In an embodiment, one or more of the three inputs to the DTC-based issue detection process 515 may be optional, such as the statistical distributions of DTC rates for a vehicle fleet 510, for example. The statistical distributions of DTC rates 510 may be constructed from one or more vehicle fleets 110 with corresponding DTC data 350. The issue database 315 may include a series of mappings between (a) vehicle makes, models, vehicle identification numbers (VINs), options, devices, accessories, software versions, DTCs, including SPN, FMI, and any additional fault codes captured by diagnostic software, and data behaviors to (b) high-level issue details, which may include vehicle make, model, VIN patterns, options, devices, accessories, safety systems, software versions, issue names, issue descriptions, maintenance plans, issue remedies, and other relevant parameters.

Figure 8:
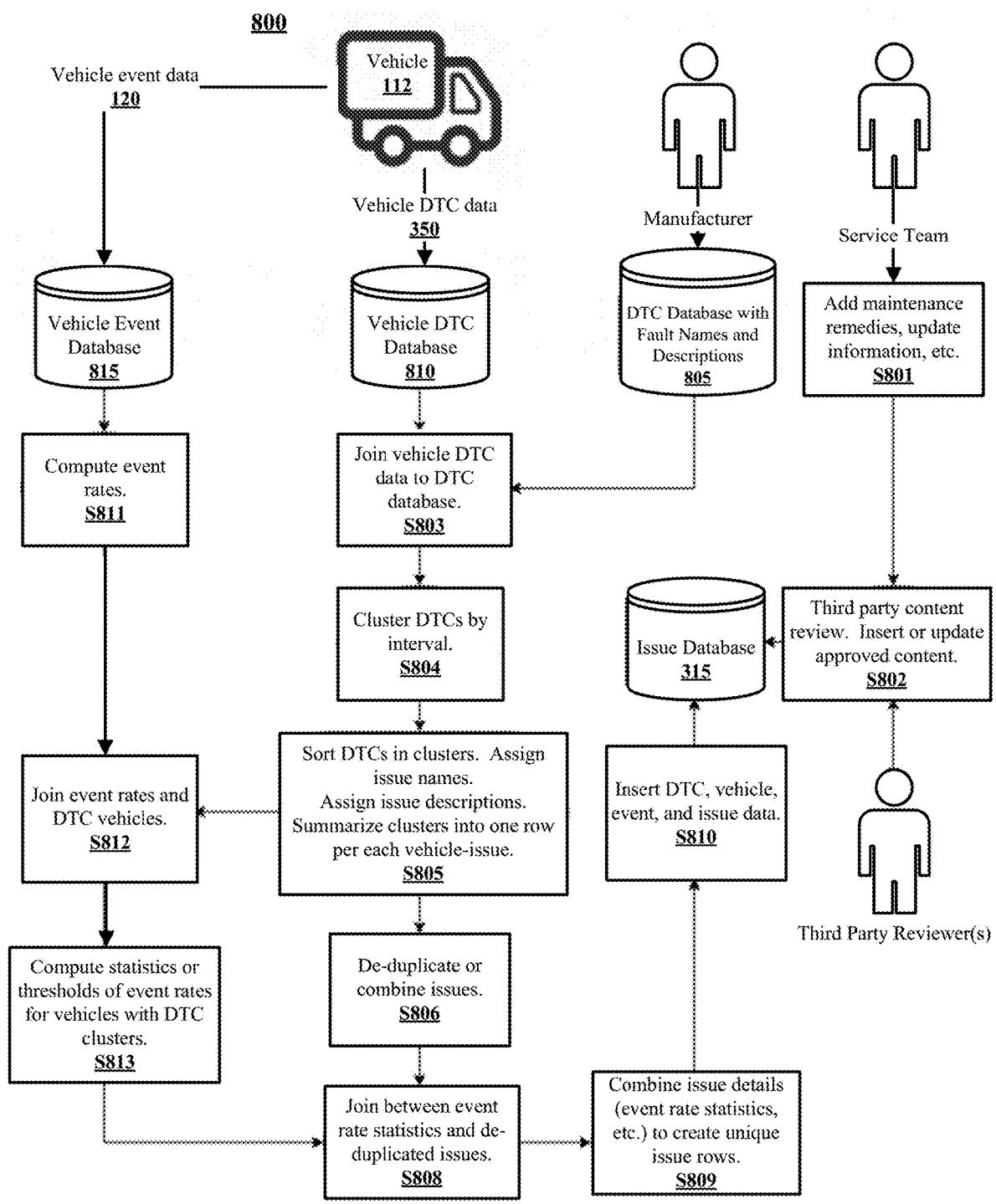
FIG. 8 illustrates an example process for creating the issue database in accordance with the present subject matter.

The issue database 315 may be created using an example process 800 shown in FIG. 8. The issue database 315 may include detailed information about vehicle issues, a historical aggregate of vehicle event rate information, including thresholds, percentiles, and the like, related to a vehicle issue. The aggregate event information may be derived from one or more vehicle fleets. Event count and/or rate thresholds may be stored in the issue database 315 per issue type. The issue detection procedure may check against these metrics in addition to matching DTCs to determine when a vehicle has a reportable issue with increased confidence.

The issues database 315 may include one or more data columns including, for example, an issue category that defines a category assigned to the vehicle issue; an issue ID that may be uniquely assigned to each vehicle issue; an issue name; an issue description that describes the vehicle issue; related subsystem ID(s) that list one or more vehicle subsystems that are linked to the vehicle issue, affected by the vehicle issue, or capable of causing the vehicle issue; a listing of one or more DTC SPN and FMI pairs related to the vehicle issue; a listing of remedies and a high-level, summary description of the remedies to resolve a vehicle issue; a detailed issue remedy that provides a longer description of the maintenance or repair steps to resolve a vehicle issue; related vehicle make, model, and/or VIN affected by a vehicle issue; the LDW event rate threshold that indicates a threshold value for the LDW event rate to relate the vehicle to the vehicle issue; the emergency braking event threshold that indicates a threshold value for the collision mitigation braking or excessive braking event rate to relate the vehicle to the vehicle issue; and a distance alert rate threshold that indicates a threshold value for the distance alert event rate to relate the vehicle to the vehicle issue. The process 800 shows an example of how the issues database 315 may be constructed using a variety of data sources, including collected vehicle event data 120, collected vehicle DTC data 350, and a manufacturer-provided DTC database 805. The sourced data may be clustered along with intermediate data processes, such as joins, filters, combinations, aggregations, database insertions, and the like. A fleet service/maintenance team may also input maintenance remedies and/or repairs and update (S801) the information of the issue database 315. The additions and updates added by the fleet service/maintenance team may be subject to approval by a third party (S802) to maintain proper data governance.

The DTC database 805 may be provided from a manufacturer of vehicle safety systems. A database 810 may also be used to store information about the DTCs captured from vehicles 110 equipped with the said vehicle safety systems. One or more DTC databases (805, 810) may be combined to form an overall DTC database used to construct the issue database 315, based on the safety systems equipped in the vehicles under consideration. The DTC databases (805, 810) may include one or more data columns, including, for example, a source ID that identifies the safety system that generates or causes the generation of the DTC; a suspect part identified by a suspect part number (SPN) that may have caused the DTC or is otherwise associated with the DTC; a failure mode identifier that identifies the reason for the DTC; a DTC ID that may be uniquely assigned to each DTC, SPN, and FMI combination; a DTC fault name that may provide a summary description of the DTC (e.g., erratic ESP sensor signal); a DTC fault description that may provide a simple description of the DTC (e.g., wheel speed sensors reversed on axle); a listing of vehicle symptoms associated with the DTC; possible causes of the DTC; conditions that may need to be met in order to clear the DTC; and a recommended corrective action. When a DTC occurs, the vehicle 112 may transmit DTC data 350 with the aforementioned DTC ID to the back-end server 310. The vehicle DTC database 810, which stores DTC data received from vehicles 112 of the vehicle fleet 110, may be joined with the manufacturer DTC database 805 in S803 to decode the received vehicle DTCs and reveal one or more of the SPN, FMI, fault name, description, and other diagnosis information for each received DTC. The joined database may be used to populate the issue database 315. In an embodiment, data may be selected from the vehicle DTC database 810 over a selected time or distance interval of consideration (e.g., the last 30 days). The resulting data may be grouped by vehicle 112. The DTCs may be clustered per vehicle group using a density-based clustering algorithm (HDB SCAN) with an epsilon interval value of s seconds (e.g., 20 seconds; minimum 2 DTCs per cluster) in S804. DTCs clusters may be identified that re-occur N or more times in the fleet of vehicles 110, where N may be greater than or equal to 1. For vehicles matching the identified clusters in the prior step, the rates of vehicle events pertaining to safety system functionality may be computed over the interval of consideration. For instance, LDW events that utilize a camera, emergency braking events that utilize the collision mitigation braking system (e.g., radar, ABS, etc.), and distance alert events that may utilize the radar. In S805, the clustered DTCs may be sorted and assigned issued names. The issue names may be based on combining DTC names, concatenation, or a user-generated name. Issue descriptions may be created for each issue named by combining DTC descriptions, concatenation, or a user-generated description. The clustered DTCs may be summarized into a list with the rest of the issue information into one row per issue. This step may prepare the data for insertion into a database. A vehicle event database 815 may store received vehicle event data 120 from the vehicle fleet 110. Using the vehicle event data 120 stored in the database 815, the event rates may be calculated in S811. The sorted, named, described, and/or summarized DTC dataset from S805 may be joined with the event rates calculated in S811 in S812. From the dataset of S812, event rate statistics may be computed in S813 that may be relevant to the vehicles experiencing issues. This may include creating event rate statistic thresholds such as the $5^{th}$ or $95^{th}$ percentile values for a certain event type, for example, that the issue vehicle event rates should be compared with (e.g., less than, equal to, greater than). The issues named in S805 may be de-duplicated via combining, merging, and/or removing overlapping issues in S806. In S808, the de-duplicated issues of S806 and the event rate statistics may be joined in and issue rows subsequently obtained (S809) that may be inserted in S810 to populate the issue database 315.

The DTC-based issue detection process 515 may detect a wide variety of vehicle issues based on the provided inputs (505, 510, 315). The detected issues may be related to anti-lock braking systems (ABS) for tractors and trailers, cameras 246, radar 260, driver assistance systems, tire pressure monitoring systems (TPMS) 224, electronic stability programs (ESP), roll stability programs (RSP), automatic traction control (ATC), and the like. The issue database 315 may include data fields such as subsystem IDs, DTCs associated with the subsystems including their SPN and FMI, additional fault codes that reveal specifically what the DTCs represent according to diagnostics software, issue names and descriptions, and suggested remedies and courses of action for the issues occurring on the various subsystems. SPN may be a Source Parameter Number. FMI may be a Failure Mode Identifier. The SPN and FMI may be used to identify DTCs collected from a J1939 data link or other communication link. The SPN may reveal which device a fault originated from. The FMI may be determined by performing a check on an electrical signal sourced from or communicably coupled to the faulted device. The defined remedies may be activated autonomously by the vehicle 112 itself, remotely by a fleet manager 160, and/or may require practical implementation by a service technician of a maintenance team.

In accordance with the disclosed subject matter, an example commercial vehicle safety system may be composed of a series of safety subsystems to provide the critical functionality necessary to operate. An example emergency braking feature for a commercial vehicle 112 may be based on a determined distance to a leading vehicle traveling in front of the commercial vehicle. The emergency braking feature may be implemented using a variety of subsystems including for example, a radar, a microprocessor, a camera, one or more ABS modules to control the brakes for both the tractor and the trailer (235/236), and a communication network 268. In an example, a controller area network (CAN) bus 268 may be used to communicably couple the various subsystems within the commercial vehicle 112. The radar and camera may be used to detect and measure the distance to a forward object, such as a leading vehicle, and may be provided to the microprocessor 230 via the communication network 268. The microprocessor 230 may be used to determine whether the commercial vehicle's braking system should be applied in an emergency fashion based on the radar, camera, and other relevant inputs. The communication network 268 may allow transmission and reception of data and instructions between the safety subsystem components. The ABS modules may be used to control the brakes (235/236) on the tractor and trailer of the commercial vehicle 112 and may operate in response to data and/or instructions received from the microprocessor 230.

The radar, camera, and ABS module(s) may transmit diagnostic information related to functionality on the communication network 268. If any one of the vehicle subsystems 214 has a problem, which is detected either by itself or another subsystem, a corresponding DTC may be generated and transmitted on the communication network 268. Using a combination of diagnostic information collected from the vehicle subsystems, it may be possible to determine whether the overall "health" and/or performance of the vehicle safety system is reduced.

The present subject matter may produce a vehicle health report 335 using both similar and/or different types of DTCs collected from the vehicle 112 across one or more safety systems and/or other vehicle subsystems. The occurrences of DTCs may be correlated to determine the overall health of the vehicle safety system using the DTC-based issue detection process 515 in conjunction with the issue database 315.

The rates at which DTCs or other events occur per selected interval 410 for each vehicle may be computed to generate the statistical distribution 510 across a fleet 110 of vehicles 112. The DTC-based issue detection 515 may then identify outliers in the DTC rate distributions and isolate those vehicles using various techniques, such as percentile, for example. An example percentile technique may begin by creating a distribution from the DTC per mile rate computed for a specific DTC type for each vehicle in a fleet. Then, the $n^{th}$ percentile of the distribution may be calculated, where n may be a predetermined threshold at which outliers take over the remainder of the distribution. The value n may be decided through data analysis and experimentation. The pool of eligible vehicles may be then filtered based on their DTC rate percentile being greater than or equal to the $n^{th}$ percentile. These vehicles may be the outlier vehicles for a specified DTC type under investigation.

The percentile technique may be applied to multiple types of DTCs and the outputs correlated to determine symptomatic vehicles. This may be performed by creating fleet distributions for each DTC type, computing the $n^{th}$ percentiles for each distribution, filtering each vehicle pool based on these percentile values, and finally, correlating the resulting outlier vehicle pools for each DTC type with each other to determine if a vehicle has multiple outlier DTCs. The percentile thresholds, n, may vary for each DTC type under analysis based on frequency of data, number of vehicles in fleet experiencing DTC, etc. Vehicles 112 that generate DTCs or other events at a rate that is disparate (outlying) from other vehicles 112 in the fleet 110 may be determined as potentially exhibiting issues. Based on generating a list of vehicles 112 that produce DTCs at a disparate rate, the DTC-based issue detection process 515 may draw conclusions as to whether the vehicles of the list are exhibiting issues and in need of further diagnosis, inspection, repair, and/or maintenance. This approach may be naïve and error-prone when used standalone, however. Therefore, the present subject matter improves upon this approach by pre-filtering the candidate vehicle pool 600 using methods like percentile, as previously outlined, before inputting to a more detailed detection approach 700 using combinations of DTCs from one or more safety subsystems or components, which may have varying SPN and FMI fault descriptors that may be correlated to detect issues over a selected interval 410 with greater certainty.

To determine whether a vehicle 112 may need inspection, repair, and/or maintenance, the approach employed by the DTC-based issue detection process 515 may identify combinations of DTCs occurring concurrently on a vehicle 112. Machine learning techniques, such as clustering (K-Means, DBSCAN, etc.), may be applied to determine groups of DTCs occurring simultaneously or within a threshold interval (time and/or distance) on a vehicle 112. An example threshold of distance between DTCs grouped with each other may be a half mile. Following this example, this means that all the DTCs in the group occurred within a half mile of at least one of the other DTCs in the group. An example threshold of time between grouped DTCs may be 15 minutes. Following this example, this means that all the DTCs in the group happened within 15 minutes of at least one of the other DTCs in the group. This approach may utilize the identified outlier vehicles determined earlier or utilize a broader pool of candidate vehicles with DTCs not exhibiting outlier DTC rates but that nonetheless reveal deterioration of safety system functionality within an identified vehicle age, make, and/or model. Other forms of diagnostic data, such as the generation of unusual DTCs that generally appear with less frequency or other unusual data activity may be combined to strengthen the likelihood that a vehicle 112 is experiencing issues. Specifically, combinations of different types of DTCs transmitted from one or more safety subsystems of a vehicle 112 may be identified that occur at similar points during an interval 410 of interest. A list of supported vehicle components and safety subsystems includes, but is not limited to, the following: forward-facing radar, forward-facing camera, driver-facing camera, mirror-mounted cameras, on-board computers associated with sensor fusion, on-board computers and controllers associated with ADAS (advanced driver assistance systems) including collision mitigation braking, steering angle sensor, yaw sensor, electronic stability program (ESP) module and sensors, roll stability program (RSP) module and sensors, automatic traction control (ATC), tractor ABS modules, trailer ABS modules, tire pressure monitoring systems (TPMS), blind-spot radar mounted on passenger side of vehicle, seatbelt sensors, and even surround-view systems that capture imagery around the entire vehicle for safety and monitoring purposes. The DTCs generated by the one or more safety subsystems, or even aggregated DTCs that form new DTCs, may also be compared with various other forms of data collected from the vehicle 112 or other vehicles of the fleet 110, including historical aggregate information such as fleet event rate threshold known to match issue criteria, to determine whether there exists a complete absence of data, an abundance of data, i.e. loss of video tracking events, or whether abnormal, outlier data is being transmitted by the related safety subsystems. Any of these cases may strengthen the certainty, and a corresponding probability score, with which the DTC-based issue detection process 515 determines that a vehicle is exhibiting issues and should be subject to one or more of diagnosis, inspection, maintenance, or repair.

Figure 6:
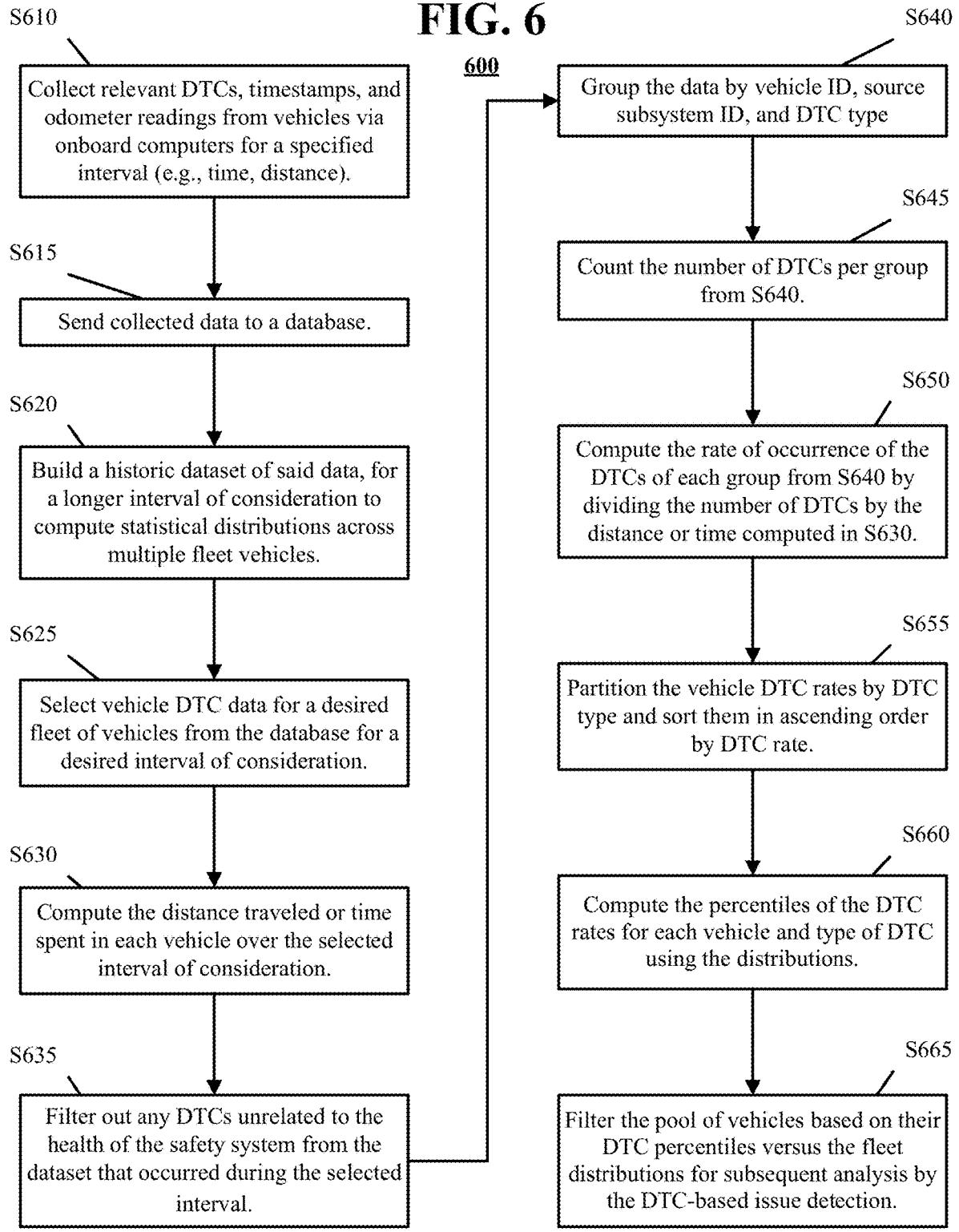
FIG. 6 illustrates an example process for pre-filtering vehicles from which issues may be detected in accordance with the present subject matter.

FIG. 6 illustrates an example process 600 for pre-filtering vehicles from which issues may be detected. For discussion purposes, various steps of process 600 may refer to DTCs but could equivalently rely on vehicle events to pre-filter vehicles according to an alternate criterion. For example, outlier vehicle event rates for events such as Loss of Video Tracking (LoVT) or LDW help in tracking down issue vehicles. LoVT events may occur when a processor or safety-related processor in the vehicle fails to detect valid video data coming from the forward-looking camera feed over a certain interval of time. There may be severe and non-severe LoVT events collected. By correlating high outlier LoVT rates with low outlier LDW rates, where a vehicle experienced few to zero lane departure events, potential issue vehicles may be further isolated. In Step S610, DTCs, odometer data, and associated timestamps may be collected from a subject vehicle 112 via its event detection and reporting system 200 over a specified interval 410. As previously discussed, the specified interval 410 may be considered either or both in terms of time or distance. In S615, the data collected in step S610 may be stored to a database or other non-transitory storage medium, such as a data store located on back-end server 310, servers 132, servers 142, system database 150, or a cloud computing and storage system. In S620, a historic dataset may be constructed from the stored data. The historic dataset may append multiple data collection events into a single comprehensive timeline of DTC occurrences for the vehicle 112. From this comprehensive timeline, a statistical distribution, such as previously discussed with reference to 510, may be computed for all vehicles 112 of the fleet 110. In S625, DTC data may be selected for a plurality of vehicles 112 of interest of the vehicle fleet 110 for a desired interval 410 of consideration. In S630, the total distance traveled or time elapsed during the interval 410 may be tallied for each vehicle 112 selected for consideration from S625. In S635, all DTCs unrelated to the health and/or performance of the safety system that occurred over the interval 410 of interest for each vehicle 112 being considered may be filtered out. The DTC data may then be grouped by unique combinations of vehicle identifier (ID), source safety subsystem ID, and DTC type in S640. The resultant groups may each resemble a unique combination of data per vehicle, source subsystem, and DTC type. There may be one or more groups of data formed per each vehicle. Each group may represent the specific DTC data associated with a specific vehicle. For example, two possible groups formed could include, 1) vehicle A with DTC A originating from source subsystem A, and 2) vehicle A with DTC B originating from source subsystem B. At this point, the number of safety system DTCs may be computed in S645 for each group from S640. For instance, as in FIG. 4, it may be seen that each vehicle 112 of interest has generated a total number of safety system DTCs over the interval 410. In S655, the rate of occurrence of DTCs across each group may be computed by dividing the number of DTCs by the interval (distance or time) computed in S630. The vehicle DTC rates may be partitioned by DTC type in S655 and sorted in ascending order by DTC rate, resulting in the DTC fleet statistical distribution. In S660, the percentiles of the DTC rates for each vehicle and DTC type may be computed using the distribution. Lastly, the pool of vehicles 112 may be filtered based on their DTC percentiles against the fleet distributions. For example, a filter could be applied where only vehicles with a DTC rate percentile of 95 or higher (out of 100) are considered. This example filter would limit the vehicle pool to only the top 5% highest DTC rate vehicles 112 from the fleet 110. From this point, the DTCs for those vehicles in the top 5% may be subjected to analysis using the DTC-based issue detection process 515. The filter could also be applied more coarsely where vehicles with a DTC rate of 50 or higher are considered by the DTC-based issue detection process 515, or any rate within a range of approximately 50 and 100.

According to the techniques disclosed in the present subject matter, vehicle issues may be detected using both similar and/or different types of DTCs from one or more safety subsystems to determine overall vehicle safety system health. The issue detection process may execute on candidate vehicles 112 exhibiting "outlier" DTC data patterns determined via the pre-filtering process 600 or using a broader pool of vehicles 112 with DTC data patterns that are not necessarily unusual or disparate from vehicles of similar make, model, and age, but may nevertheless reveal deterioration of the safety system functionality.

The complexity of the pre-filtering process 600 previously discussed may be adjusted, depending on the solution requirements, available processing resources, and the DTC and event data characteristics. For example, the pre-filtering process may require less logic and filtering criteria for a smaller vehicle fleet that is well-maintained because issue vehicles do not frequently arise so outliers are easier to detect. However, a larger fleet 110 may be more difficult to maintain and contain various makes and models of vehicle. A larger fleet 110 may utilize a more complex pre-filtering process that checks for a combination of outlier event and DTC rates, checks for a requisite minimum distance traveled or uptime to make maintenance judgements, and/or checks for when it was last maintained and what tasks or correction actions were performed, and the like. In the following description, only DTC occurrences will be discussed, although a similar process may be applied using vehicle event data, a combination of event data with DTC occurrences, or even a combination of event data that coincides temporally with DTC occurrences, to determine whether one or more vehicle issues are present. As previously discussed, looking at outlier event rates, such as a high LoVT event rate in combination with a low LDW event rate can point to problems with the forward-looking camera on a vehicle. Another example may be to identify a low forward collision warning event rate in combination with radar-related DTCs to reveal problems with the radar or its connection to the CAN bus or other vehicle communication bus 214.

Figure 7:
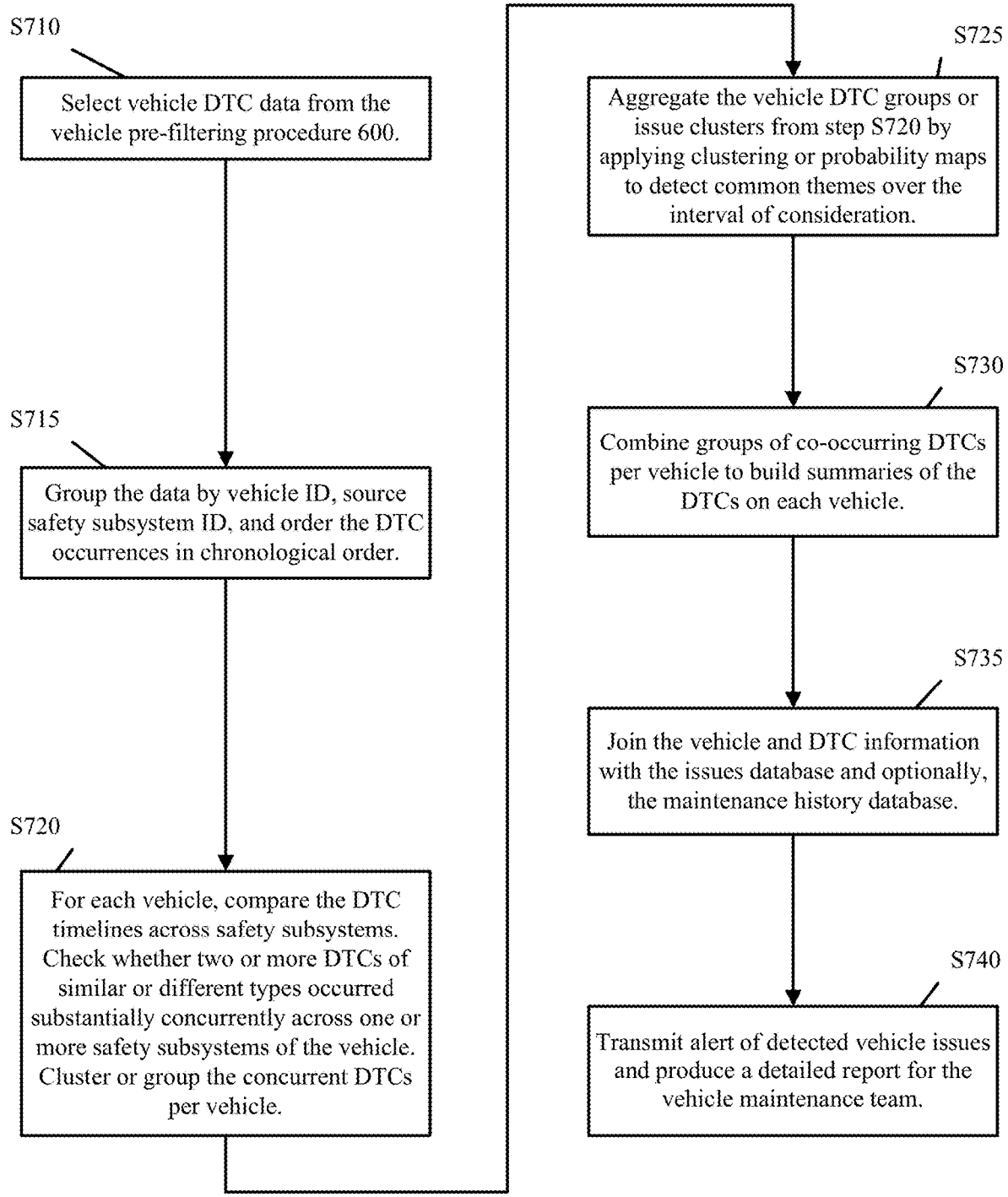
FIG. 7 illustrates a sample algorithm for detecting issues using a combination of one or more DTCs in accordance with the present subject matter.

FIG. 7 illustrates an example algorithm 700 for detecting issues using a combination of one or more DTCs and which may be executed by the back-end server 310, for example, as part of the DTC-based issue detection process 515. In S710, the vehicle DTC data may be selected following pre-filtering by process 600. The pre-filtering process 600 may reduce the amount of DTC data to be subsequently processed by the processing resources associated with back-end server 310, which may be one or more computing systems, servers, or even a cloud computing system that virtualizes processing and storage resources in a manner hidden from the user. The data may be grouped in S715 by unique combinations of vehicle ID and source safety subsystem ID. This may result in a group for each unique combination of vehicle and safety subsystem data. The DTC occurrences within each group may also be sorted chronologically during this step. In S720, for each vehicle, the DTC occurrence timelines may be compared across the various safety subsystems. Step S720 may also check whether two or more DTCs of similar or different types occurred concurrently or within a predefined threshold of one another across one or more safety subsystems of the vehicle. As used herein, the term "substantially concurrent" refers to both precisely concurrent and concurrent within a predetermined threshold either in terms of time and/or distance. If step S720 does determine two or more DTCs of similar or different types occurred substantially concurrently, this may be indicative of an issue with one or more of the sub systems.

Various renditions of the algorithms to group related DTCs of various safety subsystems and vehicle components may be applied within the algorithm 700 without departing from the scope of the present subject matter. The renditions may include one or more of the following: a) using DBSCAN clustering, b) using K-Means clustering, or c) using a distance or time-range-based SQL join between DTCs and/or events occurring on a vehicle. For one or more of the renditions, the DTCs and/or events may occur within a certain time or distance range of each other in order for their rows to be grouped with one another. At a high level, the concurrency check in step S720 may be a grouping of DTCs by time or distance, as previously discussed. More specifically, as in rendition (c) above, the concurrency check may be a time or distance range-based filtering "join" between safety subsystem datasets that results in a set of interrelated DTC groups that occurred concurrently or within a predetermined threshold of one another on the vehicle 112. The predetermined threshold within which a group of DTCs is considered concurrent may be adjustable in the algorithm 700 via a user-adjustable or automatically-selected parameter. Alternatively, or in addition, the concurrency check of S720 may be achieved via clustering, such as K-means clustering, HDBSCAN clustering, or DBSCAN clustering. In this case, DTC occurrences may be clustered for each vehicle based on the timestamp or odometer reading of the occurrences.

The clustering model parameters may be tuned to isolate groups of DTCs occurring on a vehicle 112 that may be interrelated. Like the previously-described technique, the time or distance range within which DTCs can occur and still be considered within the same cluster may be adjustable in the algorithm 700 via a user-adjustable or automatically-selected parameter when using DBSCAN, but not when using HDBSCAN. It may be preferable to use DBSCAN if setting the time or distance range manually is preferred. In step S725, the algorithm 700 may aggregate the vehicle DTC groups or issue clusters, depending on the selected implementation, to determine whether there are any common themes or common elements over the selected interval 410 of consideration. Common themes or elements may be common to the extent that they fall within a predefined threshold time or distance. Common themes or elements may include common vehicle components, such as sensors or other devices, which are used by each of the subsystems or components generating the DTCs, common vehicle subsystems, such as safety subsystems, This means that the aggregation function in step S725 may try to further combine and summarize the groups or clusters from step S720 for each vehicle based on similarity in faults and/or events that occurred within those clusters on the vehicle. Similarity in faults can be determined by comparing subsystem source ID, fault name, fault description, etc. In an embodiment rendition, string patterns may be used to identify similarities. For example, two DTCs may be similar if their fault descriptions both contain "SAS" or one contains "SAS" and another contains "STEER", either of which represent a type of steering angle sensor fault. Clustering methods, as discussed previously, may also be applied for this similarity check, which could be based on string similarity between DTC clusters or groups from step S720. A similarity metric, such as Levenshtein distance, may be used to determine a numeric value that represents how similar DTCs are to each other based on name, keywords in description, or other indicators. Probability maps may also be used to assign a numeric probability of how similar two DTC clusters are based on factors including, but not limited to, DTC patterns found in the clusters or groups from S720 that match past concurrences detected as issues, manual feedback, or other statistically-based factors, etc. These similarity values could be used to form new issue groups or clusters by comparing the similarity of one cluster to the rest and deciding to form a cluster or group and continuing this process for several iterations until all potential issue clusters or groups are formed. In step S730, groups of substantially concurrent DTCs may be combined on a per-vehicle basis to build summaries of the DTCs that occurred on each vehicle 112. For example, if there are three issue clusters detected on a vehicle over a selected interval of time as determined by step S720 and two of them are related to the collision mitigation braking safety system and have similar DTCs/events as determined by step S725, then those clusters may be grouped together to form a summary cluster for those DTCs to minimize duplication in the resultant dataset. In S735, the vehicle and DTC information may be joined with the issue database 315 and optionally, a maintenance history database, to gather all the evidence needed to make clear maintenance and safety issue alerts.

The issue database 315 and/or maintenance history database may aggregate the SPN, FMI, fault codes attained using a diagnostics system, issue names, fault descriptions, maintenance remedies, repairs, issue certainties/probabilities, issue false positive determinations, successful resolutions, and associated vehicle information, such as the vehicle make, model, year/age, mileage, and VIN. In step S740, the algorithm 700 may alert various recipients and generate a detailed report 335 of vehicle issues to be provided to a vehicle maintenance team. The recipients may include, for example, the vehicle fleet 110, fleet drivers 164, fleet managers 160, and the like.

As previously discussed, the present subject matter may employ a variety of machine-learning clustering algorithms, such as DBSCAN (Density-Based Spatial Clustering of Applications with Noise) and HDBSCAN (hierarchical density-based spatial clustering of applications with noise). In an embodiment, the DBSCAN algorithm may execute based on the following input: epsilon, which may be the maximum distance between two data samples for a sample to be considered a neighbor of the other (e.g., 1 km, 30 minutes, etc.); min_samples, which may be the minimum number of members with which to create a cluster (e.g., 2, 3, etc.); and distance_metric, which may be the metric used to compute the distances between samples (e.g., Euclidean distance). The HDBSCAN may execute using less input than DBSCAN, for example, using only the min_samples input. HDBSCAN may automatically optimize with less or without human intervention and may be preferable in some embodiments, such as for exploratory data analysis. The HDBSCAN may automatically perform DBSCAN over varying epsilon values and determine the clustering that provides improved stability via mathematical integration. Therefore, HDBSCAN may automatically find stable clusters of various densities unlike DBSCAN, which may rely on a fixed maximum density selected by a user. According to the present subject matter, HDBSCAN may be preferable to use in constructing the issue database 315, while either or both of HDBSCAN and DBSCAN may be useful with a fixed epsilon value for detecting issues. Reasonable experimentation may determine which method of clustering is optimal for issue detection based on fleet specifications such as, but not limited to, vehicle count, vehicle usage, equipment installed, data frequency, subscription tier, type or version of software installed, type of data connector, make and model of vehicles, and types of vehicles (dump truck, tractor trailer, etc.), for example. Feedback may be provided to machine learning algorithms to further train and/or re-train the clustering models.

To determine whether a vehicle 112 has an issue, clusters generated from the received vehicle DTC data 350 using the clustering algorithms previously discussed may be matched to the issue database 315 using the SPN and FMI of DTCs in the matched-cluster with the SPN and FMI list in the issue database 315. When a match is found, the vehicle issue is "lightly" associated with the cluster. If vehicle event rate thresholds, for example, are present in the issue database 315, the matched cluster's vehicle event rates are checked against the event rate thresholds present in the issue database 315. If the vehicle 112 meets the vehicle event rate thresholds in addition to the cluster of DTCs matching the issue DTCs stored in the issue database 315, the issue is more "heavily" associated with the vehicle. A vehicle may be associated with any number of concurrent issues. The relationship between vehicles 112 and issues may be expressed as many-to-many.

Figure 9:
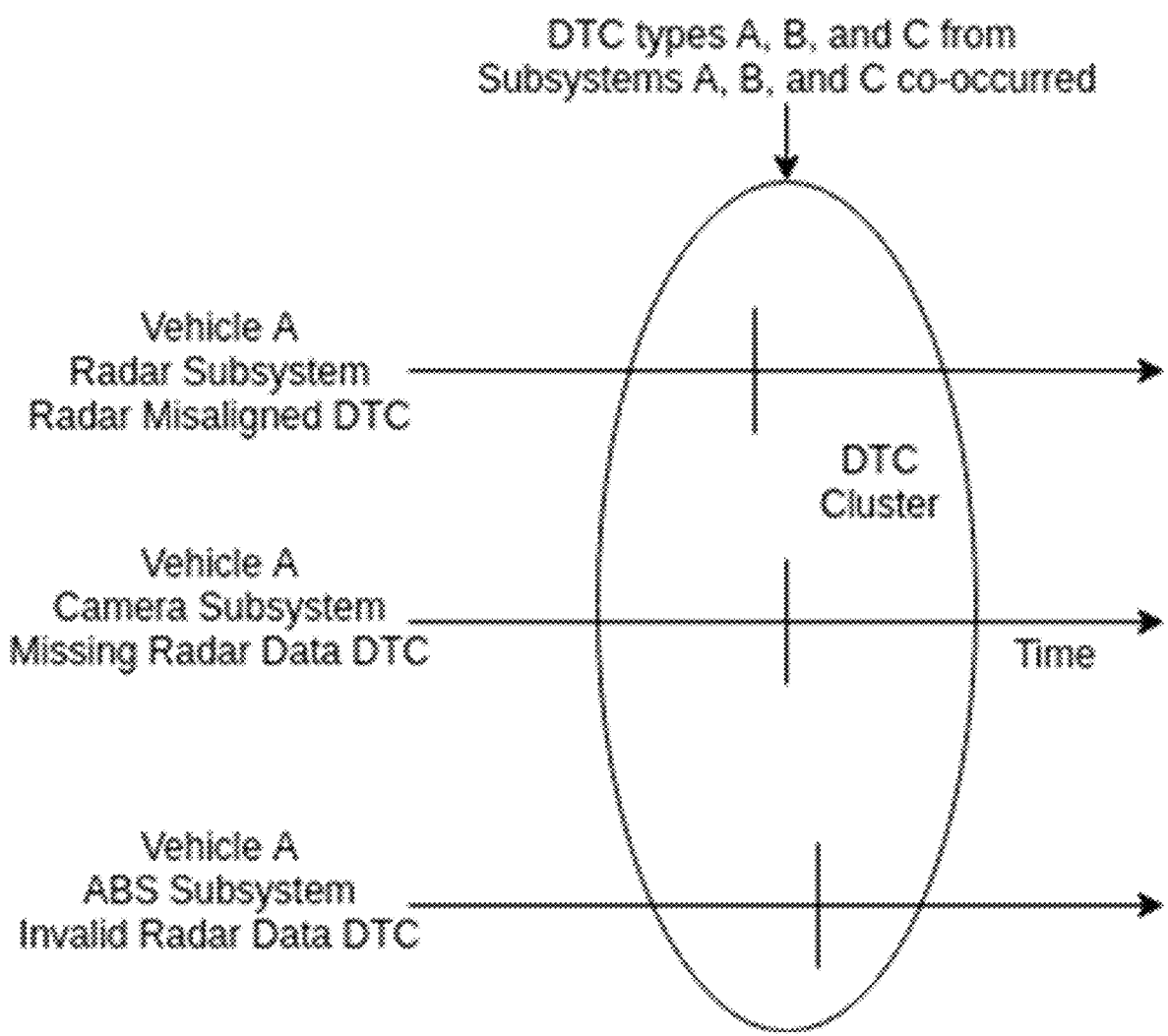
FIG. 9 illustrates an example scenario where three different types of DTCs occur substantially concurrently on a vehicle A during a selected interval of time in accordance with the present subject matter.

The following describes an example issue detection scenario in accordance with the disclosed subject matter and as illustrated in the example scenario of FIG. 9. A vehicle "A" may be equipped with a radar, camera, and ABS subsystems that may create an emergency braking safety system when used together. Vehicle "A" may generate DTCs that are unusual or at a such a rate that its behavior may be "outlying" when compared with DTCs generated by similar vehicles within a similar interval. Stated another way, vehicle "A" exhibits DTCs of one or more types that are unlike the DTCs generated in a related fleet of vehicles 110. Vehicle "A" may generate three different types of DTCs substantially concurrently over a short interval, such as within one second. In this example, vehicle "A" may generate a "radar misaligned DTC" from its "radar subsystem," a "missing radar data DTC" from its "camera subsystem," and an "invalid radar data DTC" from its "ABS subsystem." The DTC-based issue detection process 515 in accordance with the algorithm 700 may detect a potential issue based on the DTC data provided by vehicle "A." The DTCs described in this example may be correlated with the issue database 315, as described in S735, to identify details about the suspected issue, and the vehicle fleet recipients may be alerted in accordance with S740. The maintenance team, which may be one of the recipients of the alert 330, may request a detailed report 335 from back-end server 310 using a website, mobile device or smartphone application, dashboard, e-mail, text, instant messaging, and other known communication methods. The detailed report 335 may include the names of related issues, descriptions of the issues that vehicle "A" may be exhibiting, when the issues may have occurred, the symptoms that the issues may cause, and a suggested course of action to remedy the issue, such as further diagnostic testing, inspection, maintenance, and/or repair procedures.

An example alert 330 may contain information such as, "Alert: Vehicle A has 2 issues impacting emergency braking system functionality. Service this vehicle as soon as possible."

An example report may state, "Our issue detection strategy has determined that vehicle A has 2 issues that impact the emergency braking system functionality. The first issue is a misaligned radar. The second issue is a missing connection between the forward-looking camera and the radar. These issues in combination will cause the emergency braking system to intermittently apply the brakes when a guard rail is present within stopping distance on the right side of the vehicle but not when another vehicle is present within this vicinity on the left side of the vehicle. The braking system may malfunction and cause the vehicle to abruptly stop in moving traffic. This is a major safety issue. First, if the vehicle is traveling too close to a leading vehicle and needs to perform an emergency stop to avoid a collision, it may not do so. Secondly, the abrupt braking caused by the malfunctioning system may cause a trailing vehicle to collide with the rear of the vehicle. Please fix these safety system issues as soon as possible to avoid the risk of injury."

A feedback loop with a maintenance team of service technicians and other personnel may also be incorporated within the detection strategy provided by the DTC-based issue detection process 515. Feedback may be received from fleet and dealer maintenance teams through various communications channels such as websites, mobile device or smartphone applications, dashboards, e-mail, text, instant messaging, live meeting, and the like, to indicate which issues, if any, have been found within a vehicle 112, and whether the issues are consistent with those determined as prospective issues by the DTC-based issue detection process 515. The feedback may also include whether the maintenance personnel determined that a suspected issue was in fact, not an issue (a false positive result).

In addition to information regarding the vehicle issues, the feedback may also include accompanying data such as the vehicle make, model, vehicle identification numbers (VINs), options, devices, accessories, software versions, historic DTC data across multiple vehicle systems, subsystems, sensors, and components, and other data activity. The feedback may also include the maintenance history, previously identified issues, previously-applied remedies, and prospective maintenance and remedy data for issues that may be predicted to occur in the future. The issue database 315 may be populated wholly or at least in-part, or otherwise supplemented, from the feedback received from the maintenance team(s). The issue database 315 may also be populated wholly or in-part, or otherwise supplemented, from data delivered from existing maintenance databases across a variety of sources, such as files, APIs, databases, websites, dashboard input fields, and the like.

Issues detected via the DTC-based issue detection process 515 may be assigned names, descriptions, and one or more suggested or instructed courses of action. For example, a course of action may be an instruction or suggestion for a user, such as a fleet manager 160, to remotely cause a process, such as a diagnostic scan, system reset, software upgrade, or the like, to occur within the vehicle. Another example course of action may be to cause the vehicle 112 to perform an action autonomously, such as to cause it to drive itself to another service location, perform a software upgrade, perform a diagnostic scan, transmit additional data, diagnostic action autonomously. Another course of action may be to recommend inspecting a vehicle subsystem, to perform maintenance, or to perform a repair by a service technician or maintenance team. The suggested or instructed courses of action produced as a result of the issues detection process may be stored in a maintenance history database. The suggested or instructed course(s) of action may be in the form of or accompanied by an alert 330 transmitted to the fleet of vehicles 110, fleet manager 160, maintenance teams, fleet drivers 164, system administrator 162, and others via known methods of transmitting data over a data network. In an embodiment, the results of the DTC-based issue detection process 515 may be delivered similar as previously discussed for the alert 330. Specifically, the results may be transmitted via various communications channels such as websites, mobile device or smartphone applications, dashboards, e-mail, text, instant messaging, live meetings, and the like. A driver 164 of a vehicle may also receive notice of detected issues, reports, and alerts related to the same vehicle 112 or a similar vehicle using an auditory or visual alert that occurs within the passenger compartment of the vehicle 112.

The present subject matter may provide an automated, scalable solution for detecting vehicle safety system issues and alerting vehicles fleets about the issues in a timely manner. The present subject matter may be applied to vehicle fleets of various sizes from few (less than 10) to many (more than 10,000). The proposed solution improves upon prior attempts in that it may detect vehicle issues based on one or more substantially concurrent DTCs of different types generated based on different safety subsystems and based on identifying DTC patterns that are disparate, or outlying from the established norms. Combinations of different types of DTCs that occur substantially concurrently may provide more concrete evidence that a subject vehicle is exhibiting one or more issues. This DTC activity may be combined with other collected vehicle data and/or event data to determine whether the safety subsystems are yielding abnormal data, such as higher or lower than usual sensor values, empty or invalid sensor values, or no data at all, which may be indicative of deteriorating safety system health. Recipients including the fleet vehicles, fleet vehicle drivers, fleet managers, and maintenance teams may be alerted to these issues so that the appropriate course of action can be taken either by the vehicle automatically and/or autonomously, with confirmation from one or more of these recipients, or with the direct assistance and/or service of one or more of these recipients.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps, or acts are in some way inherently mutually exclusive.

Reference throughout this document to "one embodiment", "certain embodiments", "an embodiment" or similar term means that a feature, structure, or characteristic described in connection with the embodiment is included in at least one embodiment of the present subject matter. Thus, the appearances of such phrases or in various places throughout this specification are not necessarily all referring to the same embodiment. Furthermore, the features, structures, or characteristics may be combined in any suitable manner without limitation.

In accordance with the practices of persons skilled in the art of computer programming, the present subject matter is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have electrical, magnetic, optical, or organic properties corresponding to the data bits.

The term "server" means a functionally-related group of electrical components, such as a computer system that may or may not be connected to a network and which may include both hardware and software components, or alternatively only the software components that, when executed, carry out certain functions. The "server" may be further integrated with a database management system and one or more associated databases.

In accordance with the descriptions herein, the term "computer readable medium," as used herein, refers to any non-transitory media that participates in providing instructions to the processor 230 for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like. Common forms of computer-readable media include, for example, a floppy disk, a flexible disk, hard disk, magnetic tape, or any other magnetic medium, a CD-ROM, any other optical medium, any physical medium with patterns of holes, a RAM, PROM, and EPROM, a FLASH-EPROM, any other memory chip or cartridge, or any other tangible non-transitory medium from which a computer can read.

In addition, and further in accordance with the descriptions herein, the term "logic," as used herein, with respect to FIG. 2A, includes hardware, firmware, software in execution on a machine, and/or combinations of each to perform a function(s) or an action(s), and/or to cause a function or action from another logic, method, and/or system. Logic may include a software-controlled microprocessor, a discrete logic (e.g., ASIC), an analog circuit, a digital circuit, a programmed logic device, a memory device containing instructions, and so on. Logic may include one or more gates, combinations of gates, or other circuit components.

Figure 10:
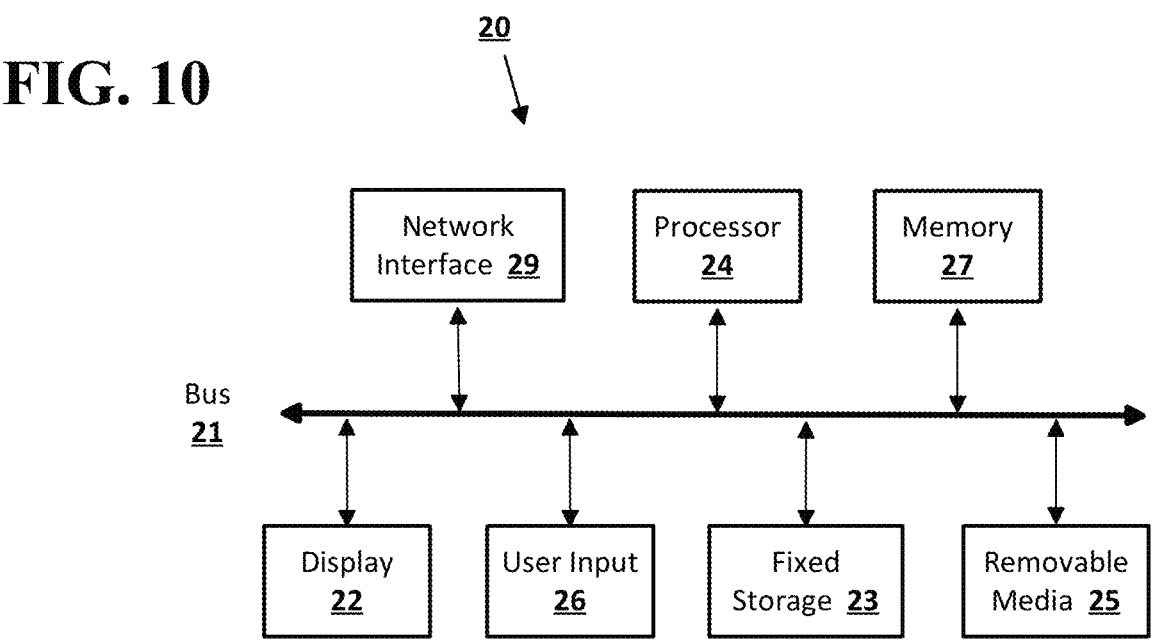
FIG. 10 is an example computing device 20 suitable for implementing embodiments of the presently disclosed subject matter.

Embodiments of the presently disclosed subject matter may be implemented in and used with a variety of component and network architectures. FIG. 10 is an example computing device 20 suitable for implementing embodiments of the presently disclosed subject matter. The device 20 may be, for example, a desktop or laptop computer, or a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components, which may include RAM, ROM, and other memory, as previously noted. Typically, RAM is the main memory into which an operating system and application programs are loaded. A ROM or flash memory component can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the computer to communicate with other computers via one or more local, wide-area, or other communication networks, as described in further detail below.

Many other devices or components (not shown) may be connected in a similar manner (e.g., document scanners, digital cameras and so on). Conversely, all the components shown in FIG. 4 need not be present to practice the present disclosure. The components can be interconnected in different ways from that shown. The operation of a computer such as that shown in FIG. 10 is readily known in the art and is not discussed in detail in this application. Code to implement the present disclosure can be stored in computer-readable storage media such as one or more of the memory 27, fixed storage 23, removable media 25, or on a remote storage location.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general-purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of detecting vehicle safety system issues, comprising:
    receiving a plurality of diagnostic trouble codes (DTCs) collected or generated by an onboard computing system of a vehicle via a network;
    determining, using one or more computing devices communicably coupled to the network, a set of two or more of the plurality of DTCs that occurred within a predetermined threshold time or distance;
    determining, using the one or more computing devices communicably coupled to the network, if source identifiers (ID) corresponding to and identifying sources for at least two of the set of two or more of the plurality of DTCs are different;
    decoding the plurality of DTCs by joining the set of the two or more of the plurality of DTCs with a database comprising associated descriptions for each of the plurality of DTCs;
    determining, using the one or more computing devices communicably coupled to the network, if a common vehicle component is used by the sources of each of the set of two or more of the plurality of DTCs having different source IDs by comparing the associated descriptions of each DTC;
    aggregating two or more DTCs into a DTC cluster, wherein each DTC in the DTC cluster is:
        determined to occur within the predetermined threshold,
        identified by a different source ID, and
        determined to have a common vehicle component used by the source of the DTC;
    correlating the DTC cluster with a vehicle safety system issue stored in an issue database; and
    transmitting an alert based on the correlated vehicle safety system issue to a recipient via the network.

2. The method of claim 1, further including determining, using the one or more computing devices communicably coupled to the network, if a quantity of the plurality of diagnostic trouble codes collected or generated by the onboard computing system of the vehicle is greater than a specified percentile of other vehicles within a vehicle fleet.

3. The method of claim 1, wherein
    the DTCs collected or generated by the onboard computing system are based on vehicle safety subsystem or component sources.

4. The method of claim 1, wherein
    at least two of the DTCs received are of different types.

5. The method of claim 1, wherein
    the vehicle is a first vehicle; and
    the method further comprises:
        receiving a second plurality of DTCs collected or generated by an onboard computing system of a second vehicle via a network,
        further including determining, using the one or more computing devices communicably coupled to the network, if the DTCs collected or generated by the first and second vehicles are unusual or disparate when compared with a third plurality of historically aggregated DTCs generated by a remaining plurality of vehicles of a vehicle fleet.

6. The method of claim 1, further comprising:
    transmitting a suggested course of action to the recipient, the suggested course of action comprising at least one of:
        a vehicle diagnostic test;
        a vehicle inspection;
        a vehicle maintenance procedure; or
        a vehicle repair procedure.

7. The method of claim 1, further comprising:
    correlating the two or more DTCs that occurred within the predetermined threshold with a vehicle safety system issue stored in a maintenance history database storing previous actions carried out on the vehicle.

8. The method of claim 1, wherein
    the issue database is populated based on feedback provided by a user; and
    the feedback identifies a vehicle issue based on a plurality of DTCs that occurred within a predetermined threshold time or distance.

9. The method of claim 1, further comprising:
receiving additional vehicle data from the onboard computing system of the vehicle; and
determining, based on the additional vehicle data, if an absence of expected data or abundance of abnormal data exists, wherein
the correlating of the two or more DTCs that occurred within the predetermined threshold with the vehicle safety system issue is further correlated with the absence of expected data or the abundance of abnormal data.

10. The method of claim 1, wherein:
the aggregating of the two or more DTCs into a DTC cluster is performed using a machine learning algorithm; and further including
assigning the DTC cluster an issue name; and
populating the issue database based on the assigned issue name and DTC cluster.

11. A system for detecting vehicle safety system issues, comprising:
a processor;
a memory in communication with the processor, the memory storing a plurality of instructions executable by the processor to cause the system to:
receive a plurality of diagnostic trouble codes (DTCs) collected or generated by an onboard computing system of a vehicle via a network;
determine if a set of two or more of the plurality of DTCs occurred within a predetermined threshold time or distance;
determine if the source identifiers (ID) corresponding to and identifying sources for at least two DTCs within the set of two or more of the plurality of DTCs are different;
decode the set of two or more of the plurality of DTCs based on a join of the set of two or more of the plurality of DTCs with a database comprising associated descriptions for each of the plurality of DTCs;
determine if a common vehicle component is used by the sources of each of the set of two or more of the plurality of DTCs having different source IDs based on a comparison of the associated descriptions of each DTC;
aggregate two or more DTCs into a DTC cluster, wherein each DTC in the DTC cluster is:
determined to occur within the predetermined threshold,
identified by a different source ID, and
determined to have a common vehicle component used by the source of the DTC;
correlate the DTC cluster with a vehicle safety system issue stored in an issue database; and
transmit an alert based on the correlated vehicle safety system issue to a recipient via the network.

12. The system of claim 11, wherein the plurality of instructions executable by the processor further cause the system to determine if a quantity of the plurality of diagnostic trouble codes collected or generated by the onboard computing system of the vehicle is greater than a specified percentile of other vehicles within a vehicle fleet.

13. The system of claim 11, wherein
the DTCs collected or generated by the onboard computing system are based on vehicle safety subsystem or component sources.

14. The system of claim 11, wherein
at least two of the DTCs received are of different types.

15. The system of claim 11, wherein
the vehicle is a first vehicle; and
the memory further comprises instructions to cause the system to:
receive a second plurality of DTCs collected or generated by an onboard computing system of a second vehicle via a network, and
determine if the DTCs collected or generated by the first and second vehicles are unusual or disparate when compared with a third plurality of historically aggregated DTCs collected or generated by a remaining plurality of vehicles of a vehicle fleet.

16. The system of claim 11, wherein the memory further comprises instructions to cause the system to:
transmit a suggested course of action to the recipient, the suggested course of action comprising at least one of:
a vehicle diagnostic test;
a vehicle inspection;
a vehicle maintenance procedure; or
a vehicle repair procedure.

17. The system of claim 11, wherein the memory further comprises instructions to cause the system to:
correlate the two or more DTCs that occurred within the predetermined threshold with a vehicle safety system issue stored in a maintenance history database storing previous actions carried out on the vehicle.

18. The system of claim 11, wherein
the issue database is populated based on feedback provided by a user; and
the feedback identifies a vehicle issue based on a plurality of DTCs that occurred within a predetermined threshold time or distance.

19. The system of claim 11, wherein the memory further comprises instructions to cause the system to:
receive additional vehicle data from the onboard computing system of the vehicle;
and determine, based on the additional vehicle data, that an absence of expected data or abundance of abnormal data exists, wherein
threshold with the vehicle safety system issue is further correlated with the absence of expected data or the abundance of abnormal data.

20. The system of claim 11, wherein the aggregation of the two or more DTCs into a DTC cluster is performed using a machine learning algorithm;
wherein the plurality of instructions executable by the processor further cause the system to
assign the DTC cluster an issue name; and
populate the issue database based on the assigned issue name and DTC cluster.

* * * * *